(12) United States Patent
Schuetze et al.

(10) Patent No.: US 7,314,059 B2
(45) Date of Patent: Jan. 1, 2008

(54) SYSTEMS AND METHODS FOR CONTROLLING PRESSURE OF FLUIDS

(75) Inventors: Karl T. Schuetze, Austin, TX (US); Matthew D. Weaver, Austin, TX (US)

(73) Assignee: Active Power, Inc., Austin, TX (US)

( * ) Notice: Subject to any disclaimer, the term of this patent is extended or adjusted under 35 U.S.C. 154(b) by 264 days.

(21) Appl. No.: 10/943,328

(22) Filed: Sep. 17, 2004

(65) Prior Publication Data
US 2006/0060246 A1 Mar. 23, 2006

(51) Int. Cl.
G05D 16/20 (2006.01)

(52) U.S. Cl. .............. 137/487.5; 137/14; 137/102; 137/488; 251/30.01

(58) Field of Classification Search ............ 137/14, 137/102, 487.5, 488, 565.34; 251/26, 31
See application file for complete search history.

(56) References Cited

U.S. PATENT DOCUMENTS

| | | | |
|---|---|---|---|
| 3,516,429 A * | 6/1970 | Sandstede et al. ....... 137/87.04 |
| 3,677,008 A | 7/1972 | Koutz | |
| 3,869,857 A | 3/1975 | Margen | |
| 4,100,745 A | 7/1978 | Gyarmathy et al. | |
| 4,110,987 A | 9/1978 | Cahn et al. | |
| 4,124,805 A | 11/1978 | Jacoby | |
| 4,147,204 A | 4/1979 | Pfenninger | |
| 4,150,547 A | 4/1979 | Hobson | |
| 4,158,145 A | 6/1979 | Kartsounes et al. | |
| 4,213,478 A | 7/1980 | Olsen et al. | |
| 4,229,661 A | 10/1980 | Mead et al. | |
| 4,237,692 A | 12/1980 | Ahrens et al. | |
| 4,281,256 A | 7/1981 | Ahrens et al. | |
| 4,347,706 A | 9/1982 | Drost | |
| 4,401,263 A | 8/1983 | Crowson | |
| 4,405,010 A | 9/1983 | Schwartz | |
| 4,460,834 A | 7/1984 | Gottfried | |
| 4,489,483 A | 12/1984 | Crowson | |
| 4,492,246 A | 1/1985 | Prescott | |
| 4,512,357 A | 4/1985 | Earl | |
| 4,532,951 A | 8/1985 | Fermanich | |
| 4,579,137 A | 4/1986 | Brandt | |
| 4,593,202 A | 6/1986 | Dickinson | |

(Continued)

FOREIGN PATENT DOCUMENTS

GB 2 292 234 A * 2/1996

(Continued)

OTHER PUBLICATIONS

RJ Foy, "Self Contained Power Supply on the Radio-Based ECP Braking System," GE Transportation Systems: Global Signaling, Sep. 2001.

(Continued)

*Primary Examiner*—Ramesh Krishnamurthy
(74) *Attorney, Agent, or Firm*—Ropes & Gray LLP; Hassan Albakri

(57) ABSTRACT

Systems and methods for using a dual-path fluid routing system that uses a flow restriction device to enhance temperature and pressure control of fluid are provided. Systems and methods for using a setpoint pressure control system to accurately control the setpoint pressure of a regulator are also provided.

12 Claims, 17 Drawing Sheets

U.S. PATENT DOCUMENTS

| | | | |
|---|---|---|---|
| 4,727,930 A | 3/1988 | Bruckner et al. | |
| 4,756,164 A | 7/1988 | James | |
| 4,765,142 A | 8/1988 | Nakhamkin | |
| 4,872,307 A | 10/1989 | Nakhamkin | |
| 4,936,098 A | 6/1990 | Nakhamkin | |
| 4,941,530 A | 7/1990 | Crowe | |
| 4,944,344 A | 7/1990 | Crowe | |
| 4,961,441 A * | 10/1990 | Salter | 137/14 |
| 5,047,965 A * | 9/1991 | Zlokovitz | 700/282 |
| 5,088,005 A | 2/1992 | Ciaccio | |
| 5,370,152 A | 12/1994 | Carey | |
| 5,379,589 A | 1/1995 | Cohn et al. | |
| 5,396,923 A * | 3/1995 | Allen et al. | 137/487.5 |
| 5,491,969 A | 2/1996 | Cohn et al. | |
| 5,495,709 A | 3/1996 | Frutschi | |
| 5,537,822 A | 7/1996 | Shnaid et al. | |
| 5,602,462 A | 2/1997 | Stich et al. | |
| 5,731,645 A | 3/1998 | Clifton et al. | |
| 5,845,479 A | 12/1998 | Nakhamkin et al. | |
| 5,889,659 A | 3/1999 | Emmerich | |
| 5,924,505 A | 7/1999 | Theurillat et al. | |
| 5,934,063 A | 8/1999 | Nakhamkin | |
| 6,108,206 A | 8/2000 | Criniti et al. | |
| 6,109,018 A | 8/2000 | Rostrup-Nielsen et al. | |
| 6,191,945 B1 | 2/2001 | Belady | |
| 6,192,687 B1 | 2/2001 | Pinkerton et al. | |
| 6,230,518 B1 | 5/2001 | Hahn et al. | |
| 6,230,791 B1 | 5/2001 | Van Dine et al. | |
| 6,244,037 B1 | 6/2001 | Nakhamkin et al. | |
| 6,255,743 B1 | 7/2001 | Pinkerton et al. | |
| 6,305,401 B1 | 10/2001 | Uehara et al. | |
| 6,305,463 B1 | 10/2001 | Salmonson | |
| 6,338,358 B1 * | 1/2002 | Watanabe et al. | 137/102 |
| 6,411,512 B1 | 6/2002 | Mankaruse | |
| 6,422,016 B2 | 7/2002 | Alkhamis | |
| 6,463,738 B1 | 10/2002 | Pinkerton et al. | |
| 6,494,042 B2 | 12/2002 | Bronicki | |
| 6,584,999 B2 * | 7/2003 | Inayama et al. | 137/487.5 |
| 6,634,277 B2 | 10/2003 | Brachert | |
| 6,634,421 B2 | 10/2003 | Ognibene | |
| 2004/0148922 A1 | 8/2004 | Pinkerton | |
| 2004/0148934 A1 | 8/2004 | Pinkerton et al. | |

FOREIGN PATENT DOCUMENTS

| | | |
|---|---|---|
| WO | WO 96/01942 | 1/1996 |
| WO | WO 99/15319 | 4/1999 |
| WO | WO 02/44555 A | 6/2002 |

OTHER PUBLICATIONS

Shinskey, F.G., Process Control Systems, 4th ed., McGraw Hill, 1996, pp. 82-84 and pp. 279-285.

* cited by examiner

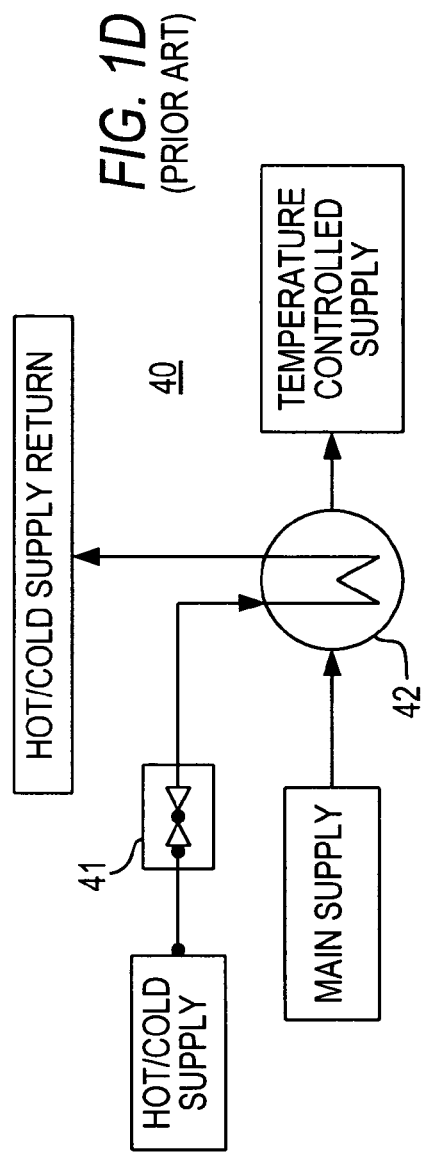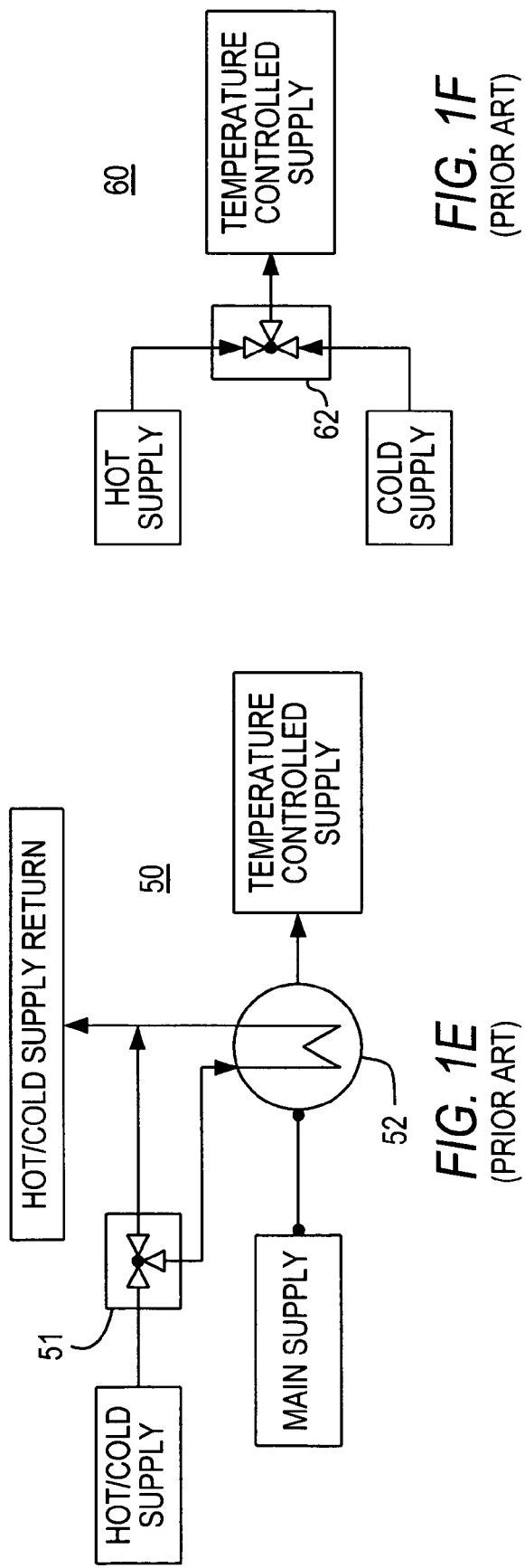

SYSTEMS AND METHODS FOR CONTROLLING PRESSURE OF FLUIDS

BACKGROUND OF THE INVENTION

The present invention relates to systems and methods for controlling the temperature and pressure of fluids.

Fluids such as gas, liquid, and mixtures thereof are used in many different applications. For example, fluids are used in chemical process systems, industrial process systems, and electrical generation systems. In order for such systems to operate, the system may require that the fluid have a predetermined temperature and pressure. For example, an electrical generation system that utilizes compressed gas to drive a turbine-generator may require the gas to have a predetermined temperature and pressure to maximize the operating efficiency of the turbine-generator.

Several automated and non-automated techniques have been employed to control temperature and pressure of fluids being used in such systems. However, these techniques have several shortfalls. For example, non-automated techniques are unable to maintain the temperature and pressure of fluids because of the stochastic nature of the system utilizing the fluid. That is, non-automated techniques are unable to take into account factors such as parasitic thermal capacitances, pressure swings, and mass flow and pressure demands, that affect the temperature and pressure of the fluid. Moreover, even if automated systems for controlling pressure and temperature are employed, their performance and applicability are often limited by one or more of the following factors:

(1) slow dynamic response;
(2) limited operating range and accuracy;
(3) maximum operating pressure limitations;
(4) excessive size; and
(5) excessive cost.

Furthermore, attempts to compensate for changes in temperature and pressure result in an overshoot or undershoot in obtaining the desired temperature and pressure because the system may only be capable of making coarse adjustments.

Whether the temperature and pressure control techniques are automated or non-automated, such techniques typically use pressure regulators, flow control valves, or a combination thereof to implement temperature and pressure control. An electronic control system may be needed to operate pressure regulators and/or flow control valves in accordance with a temperature and pressure control technique. Such control systems may include devices specifically designed to control operation of a regulator, such as a dome loaded pressure regulator, by setting the setpoint pressure of the regulator. The setpoint pressure sets the pressure output of the regulator, minus a predetermined pressure drop caused by the internal mechanism of the regulator. These devices typically convert an electrical signal into an appropriately scaled pressure and include devices such as servo regulators, current to pneumatic (I/P) or voltage to pneumatic (E/P) transducers or converters. Thus, this appropriately scaled pressure may used to set the setpoint pressure of the pressure regulator.

However, these conventional electronic pressure control devices for setting the setpoint pressure are limited. For example, certain conventional control devices may be limited to providing maximum output pressures to 150 PSI and require a constant bleed to atmosphere during operation. A maximum output pressure of 150 PSI is limiting because the setpoint pressure may not be set to a pressure above 150 PSI. A constant bleed to atmosphere is undesirable because the source of such fluid may require constant replenishment. This can be costly or decrease operating efficiency. Other control devices may be capable of operating at pressures approaching 1000 PSI, but are susceptible to unsafe operating conditions, especially if the control system loses power. Another drawback of conventional pressure control devices is that many redundant or unnecessary electrical and mechanical components (e.g., digital-to-analog converters, pneumatics, etc.) are required to enable conventional pressure control systems to operate. This adds cost and decreases reliability.

In view of the foregoing, it is an object of the invention to provide improved systems and methods for controlling temperature and pressure of fluids.

It is also an object of the invention to provide a fluid routing system that rapidly and accurately changes the temperature of a fluid.

It is a further object of the invention to provide improved systems and method for accurately controlling the setpoint pressure being applied to a pressure regulator.

It is yet a further object of the invention to provide improved pressure control devices capable of providing failsafe operation, while limiting unnecessary leakage.

SUMMARY OF THE INVENTION

These and other objects of the invention are accomplished in accordance with the principles of the present invention by providing a dual-path fluid routing system and a pressure setpoint control system. The dual-path fluid routing system according to the invention accurately controls temperature and pressure of a fluid by routing fluid through two separate paths, one of which substantially changes the temperature of the fluid flowing therethrough, before combining the fluid in both paths to yield a desired fluid temperature and pressure. The fluid routing system controls the mass flow through each path to selectively blend together fluids of different temperature to obtain a predetermined temperature, while maintaining a predetermined pressure.

The fluid routing system may include a heat exchanger that heats or cools the fluid flowing through one of the paths. For example, in a stored air energy system, a heat exchanger such as a thermal storage unit may be used to heat the fluid. For clarity and ease of presentation, one path may provide a heated fluid and the other path may provide a cool fluid. In other embodiments, the fluid routing system may not use a heat exchanger, but may receive fluid from two separate sources, where one source provides fluid at a substantially different temperature than the other source. For example, one source may provide a fluid at a relatively high temperature and the other source may provide fluid at an ambient temperature.

A desired temperature is produced by controlling the mass flow of fluid through the two paths. By controlling mass flow, the ratio of heated fluid to cool fluid being mixed together can be controlled. For example, temperature of the combined fluid may be raised by increasing the mass flow of fluid through the path that heats the fluid (the main path) relative to the path that does not heat the fluid (the bypasses path). The temperature of the combined fluid may be lowered by decreasing the mass flow through the main path relative to mass flow through the bypass path.

An advantage of the invention is that the ability to control mass flow is significantly improved over the prior art, yielding greater temperature control resolution not previously achieved. Such greater temperature control may be possible because fluid routing systems according to the invention are able to exercise precision control over mass flows in each path. More particularly, the control of mass flow in one path may be performed independent of mass flow in the other path. Such independent control may be possible because the flow control means (e.g., regulator and/or flow control valve) responsible for controlling mass flow are operationally "decoupled" from each other, even though both paths may be connected to the same fluid source and/or provide their respective fluids to a common outlet node.

This operational decoupling may be realized by restricting mass flow in one of the paths using a flow restriction device (e.g., an orifice, valve, or screen). Such a device may substantially restrict mass flow, thereby creating a high resistance path. Thus, one path provides relatively unhindered mass flow, whereas the other path provides restricted mass flow. As a result, one path (the main path) may be primarily responsible for controlling the pressure and temperature of the combined fluid, and the other path (the bypass path) influences, or fine tunes, the pressure and temperature of the combined fluid. The other path is able to fine tune the pressure and temperature because the flow restriction device provides the ability to accurately change the mass flow through the restrictive path by manipulating the pressure upstream of the restrictive device.

In one embodiment of the present invention, a fluid routing system may use two pressure regulators to control the temperature and pressure of a fluid. The fluid system may be constructed to have a main path, which includes a regulator and a heat exchanger, and a bypass path, which includes a regulator and a flow restriction device. Both the main path and the bypass path may be connected to receive fluid from a fluid source and the output of both paths are coupled together at an output node. The heat exchanger may heat or cool the fluid flowing through the main path. The pressure and temperature of the combined gas may be primarily controlled by the main path, but is influenced by the pressure and temperature of fluid flowing through the bypass path.

During operation, one regulator controls the pressure and mass flow of fluid routed through the main path and the other regulator controls the pressure and mass flow of fluid routed through the bypass path. A predetermined temperature and pressure of fluid is maintained by adjusting the setpoint pressure of the regulators. The setpoint pressure is the fluid pressure maintained at the outlet of the regulator, including a pressure offset that is a function of the internal components of the regulator. Increasing the setpoint pressure of a particular regulator results in an increase of mass flow, and vice versa. Thus, by changing the pressure, the mass flow through a particular path can be changed, which in accordance with the principles of the present invention affects the quantity of heat provided to the outlet node. For example, if the outlet node temperature is too hot, the bypass regulator may increase its setpoint pressure to route more cold fluid to the outlet node to lower the temperature.

It is noted that certain regulators such as, for example, dome-loaded regulators have internal mechanisms or internal components for controlling mass flow of fluid through the regulator. This internal mechanism may vary the mass flow through the regulator such that the output pressure is substantially equal to the setpoint pressure minus a predetermined offset due to the internal configuration of the regulator. The internal mechanism responds to an imbalance between the setpoint pressure and the downstream pressure. Therefore, the mechanism may vary mass flow in response to changes in downstream conditions as well as to changes in setpoint pressure. For example, if the setpoint pressure is set to a predetermined pressure level and the pressure at the outlet of the regulator is above that predetermined pressure level, the internal mechanism may automatically reduce the mass flow through the regulator to maintain the predetermined pressure level at the regulator outlet. If the pressure at the regulator outlet falls below the setpoint pressure, the regulator may automatically increase the mass flow to maintain the predetermined pressure level.

The main path and bypass path regulators operate in concert with each other to maintain a desired pressure and temperature. For example, when the bypass regulator pressure setpoint is increased to increase mass flow through the bypass path, the pressure at the common outlet node rises. To counteract this increase in pressure, the main path regulator may decrease its mass flow (by adjusting its internal components) to an extent necessary to maintain its setpoint pressure, and thereby maintain the desired pressure at the outlet node. Thus, an interplay of changes in setpoint pressures and mass flow (including mass flow adjustments performed by the internal mechanism) controls the fluid pressure and temperature at the outlet node.

In another embodiment of the present invention, a fluid routing system may use a regulator and a flow control valve to control the temperature and pressure of a fluid provided to an outlet node. In this arrangement, the regulator, a flow restriction device, and a heat exchanger may form a main path and the flow control valve may form the bypass path. The regulator is connected to receive fluid from a fluid source and both the heat exchanger and flow control valve are connected to the outlet node. The input of the flow control valve may be connected to a node between the regulator and the flow restriction device.

The regulator may control the pressure of the fluid provided to the outlet node and the flow control valve controls the mass flow of fluid through both the main and bypass paths. This embodiment may be constructed such that the mass flow through the bypass path is inversely proportional to the mass flow through the main path. For example, when the flow control valve increases the mass flow rate through the bypass path, the mass flow rate through the main path is decreased. Thus, by adjusting the mass flow rate of the flow control valve, the temperature of the fluid provided to the outlet node can be controlled.

Another aspect of the invention is a pressure setpoint control system. This system accurately controls the setpoint pressure being applied to a regulator (e.g., a dome-loaded regulator), while having the ability to operate over a wide range of pressure (e.g., 0-1000 PSI). In addition, the pressure setpoint system provides failsafe operation by venting any fluid being applied to the setpoint port to atmosphere in the event of a power failure or other abnormal operation. Such a pressure setpoint control system may be used to control, for example, one or more pressure regulators of a dual-path fluid routing system, as discussed above, or may be used to control a pressure regulator of conventional fluid routing system.

The pressure setpoint control system may control the setpoint pressure of a regulator by selectively applying fluid to and venting fluid from the setpoint port of the regulator. Fluid may be applied and vented from the setpoint port using two valves (e.g., solenoid valves), which are turned ON and OFF according to a duty cycle provided by control circuitry. The valves may be connected in series, with a first valve having its input connected to receive fluid and its output connected to the setpoint port and the input of the second valve. The outlet of the second valve is connected to atmosphere. When the first valve is ON and the second valve is OFF, fluid is applied to the setpoint port, resulting in an increase of the setpoint pressure. When the first valve is OFF and the second valve is ON, fluid is vented from the setpoint port, resulting in a decrease of the setpoint pressure. It is noted that there may be instances in which both valves are ON, or when both valves are OFF.

The pressure setpoint control system may employ the use of another valve to ensure failsafe operation. This failsafe valve may have its inlet connected to the setpoint port of the regulator and have its outlet connected to atmosphere. This failsafe valve may be CLOSED when the control system is operating in a normal mode of operation so that the first and second valves can control the setpoint pressure. However, in the event of a failsafe condition (e.g., power failure of other abnormal condition), the failsafe valve automatically OPENS, thereby venting the fluid in the setpoint port to atmosphere.

The dual-path fluid routing system and pressure setpoint control system according to the invention may be used in chemical process systems, industrial process systems, and electrical generation systems that use fluids. In electrical generation systems such as thermal and compressed air storage systems, compressed air may be drawn from an air source to power a turbine-generator. The fluid routing system may condition the compressed air by controlling the temperature and pressure of air prior to providing it to the turbine-generator. For example, the fluid routing system may heat and regulate the compressed air such that the temperature and pressure of the air supplied to the turbine inlet satisfies predetermined inlet conditions. If desired, the pressure setpoint control system according to the invention may be used to control one or more pressure regulators of the fluid routing system being used in an electrical generation system.

Moreover, the fluid routing system may provide a desired turbine inlet gas to the turbine-generator despite the stochastic operation of a stored fluid electrical generation system. That is, the fluid routing system may respond to a variety of factors, including but not limited to, varying fluid supply pressure, temperatures changes caused by expansion of fluid, parasitic thermal capacitances, changes in pressure and temperature demands, and changes in heat sources such as a thermal storage unit and provide predetermined turbine inlet conditions to the turbine.

Furthermore, the pressure setpoint control system can operate in fluid systems that require high pressure control (e.g., pressures ranging between 0 to a 1000 PSI) minimal leakage, and safe operations. In addition, pressure setpoint control systems can be controlled using simplified and non-redundant control electronics, thereby increasing reliability and cutting costs.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 1D-F show several prior art valve configurations for controlling temperature;

DETAILED DESCRIPTION OF THE INVENTION

Figure 1A:
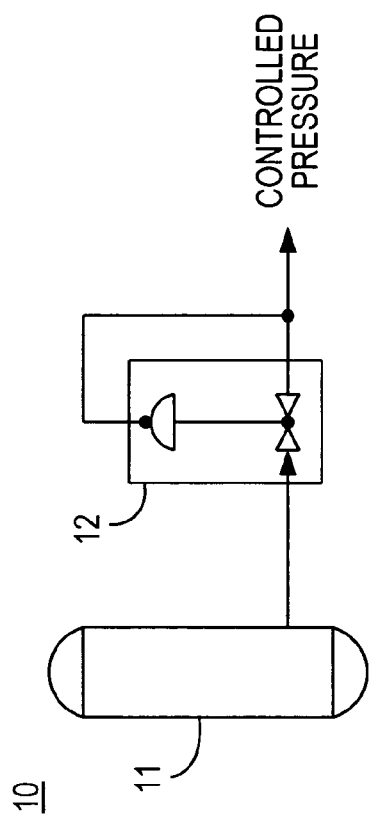
FIGS. 1A-C show several prior art valve configurations for controlling pressure.
Figure 1C:
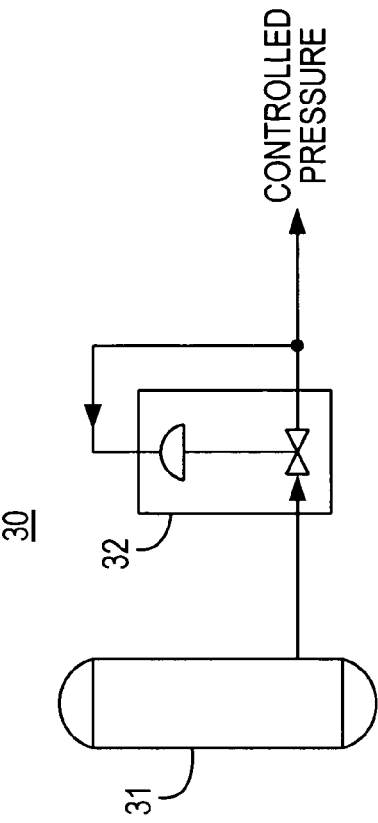
Figure 1B:
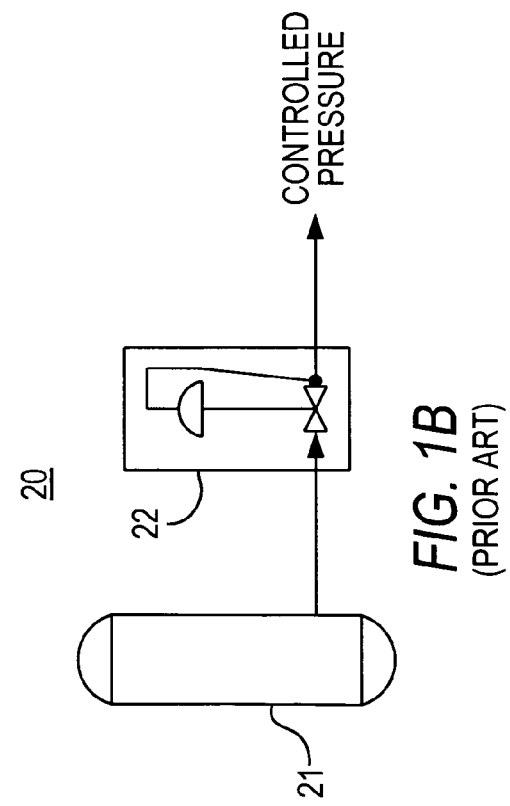

FIGS. 1A-C show several prior art systems for controlling pressure. FIG. 1A shows a prior art flow control valve pressure system 10 for controlling pressure. Flow control valve 12 regulates the downstream pressure of fluid provided by fluid reservoir 11 by adjusting the mass flow rate. A feedback loop may be provided to control the flow rate set by valve 12 depending on the pressure downstream of the valve 12. For example, if the pressure is too low, valve 12 opens to increase flow and thereby increase the pressure. If the pressure is too high, valve 12 closes to restrict flow of fluid and thereby decrease the pressure.

FIGS. 1B and 1C show prior art regulator systems 20 and 30, respectively, for controlling the pressure. Regulators 22 and 32 may output a predetermined pressure based on a setpoint pressure applied to a setpoint port of regulators 22 and 32. Regulators 22 and 32 may maintain the predetermined outlet pressure by automatically adjusting their internal components to vary the mass flow provided downstream, such that the downstream pressure is equal to or about equal to the pressure setpoint of the regulator minus a predetermined offset (e.g., a nominal offset that is a function of the internal configuration of the regulator). Regulator system 20 may use an internal sensing scheme to control the pressure of the fluid supplied by fluid reservoir 21. Such a scheme may adjust the regulator's internal components based on pressure measured at the outlet of the regulator. Regulator system 30 may use a remote sensing scheme to control the pressure of the fluid supplied by reservoir 31. Such a scheme may adjust the regulator's internal components based on pressure measured at a point downstream from the regulator.

Although the pressure systems shown in FIGS. 1A-C are capable of regulating pressure, such systems are not capable of accurately controlling the temperature of the fluid provided downstream of the regulator or flow control valve. Moreover, when systems 10, 20, and 30 make mass flow or pressure adjustments to change the pressure supplied downstream, the resolution of such changes is generally coarse—that is, these systems may be incapable of making relatively small pressure adjustments.

FIGS. 1D-F show several prior art systems for controlling temperature. FIG. 1D shows prior art temperature control system 40 that heats/cools fluid supplied from a main supply through a heat exchanger 42. The quantity of heated/cooled fluid supplied to heat exchanger 42 is controlled by flow control valve 41. For example, to heat the fluid supplied by the main supply, flow control valve 41 may increase the flow rate of heated fluid supplied to heat exchanger 42.

FIG. 1E shows an alternative prior art system 50 for controlling temperature. System 50 includes a three-way valve 51 that routes heated/cooled fluid to heat exchanger 52 and to the heated/cooled fluid return. This is an improvement over system 40 because it improves the heating/cooling stability and response time of controlling the temperature. FIG. 1F shows yet another prior art system 60 for controlling temperature. During operation three-way valve 61 blends a hot fluid supply and cold fluid supply to achieve a desired fluid temperature.

Each of the foregoing temperature control systems are limited in ability to rapidly change temperature and to change temperature with a high degree of resolution. Moreover, such systems may not be capable of controlling pressure. Furthermore, the three-way control valves are expensive and bulky.

Figure 2A:
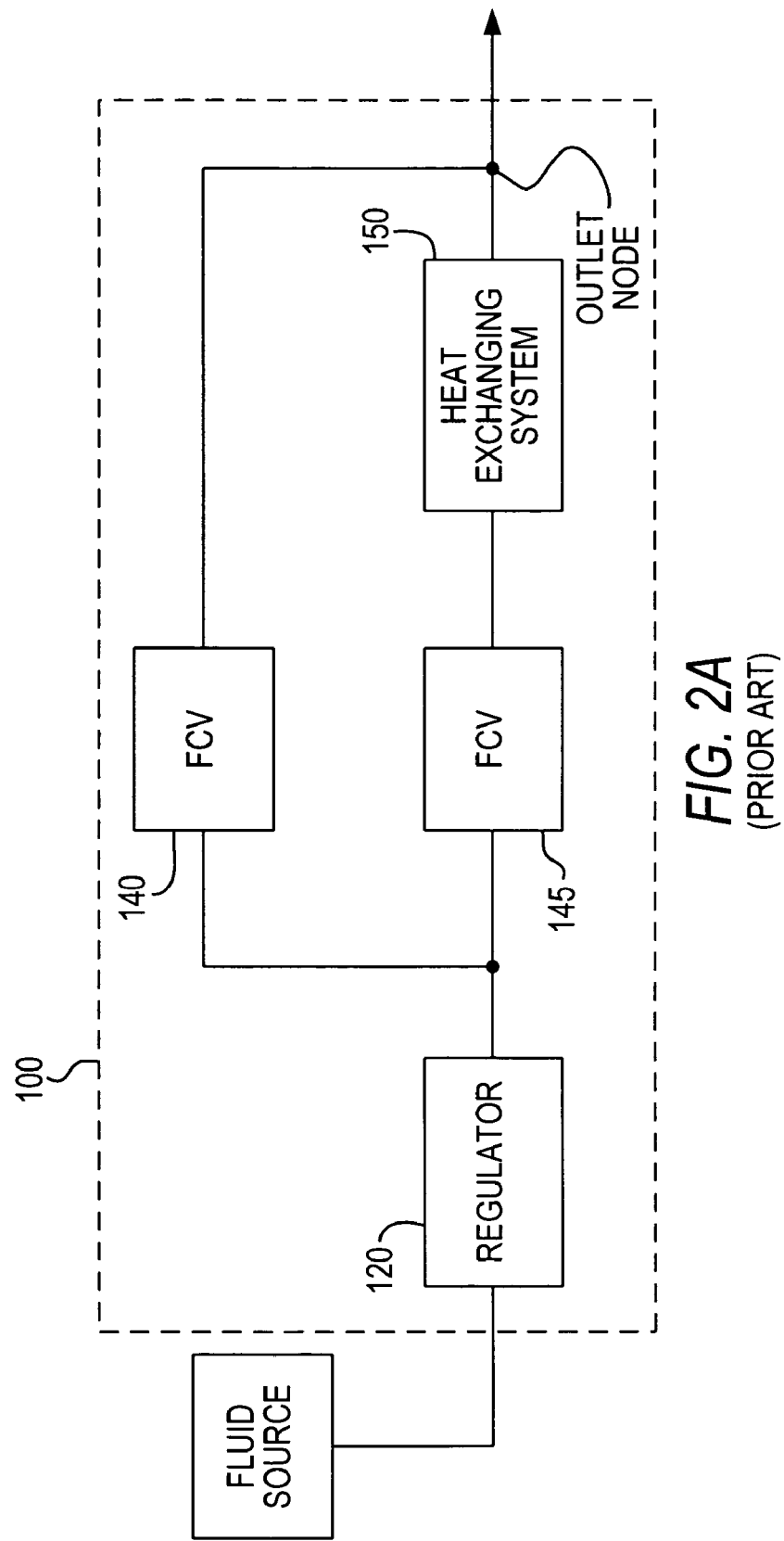
FIG. 2A-C show schematics of several prior art dual-path fluid routing systems for controlling temperature and pressure.
Figure 2B:
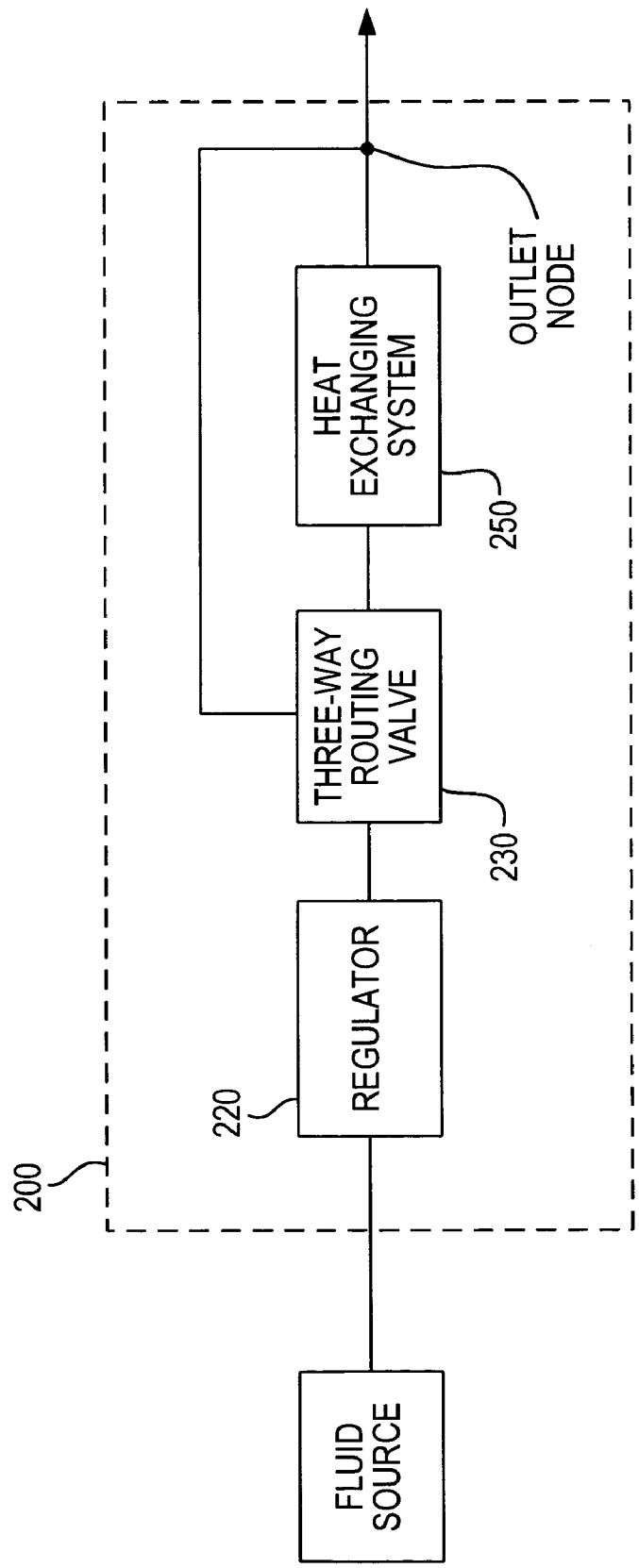
Figure 2C:
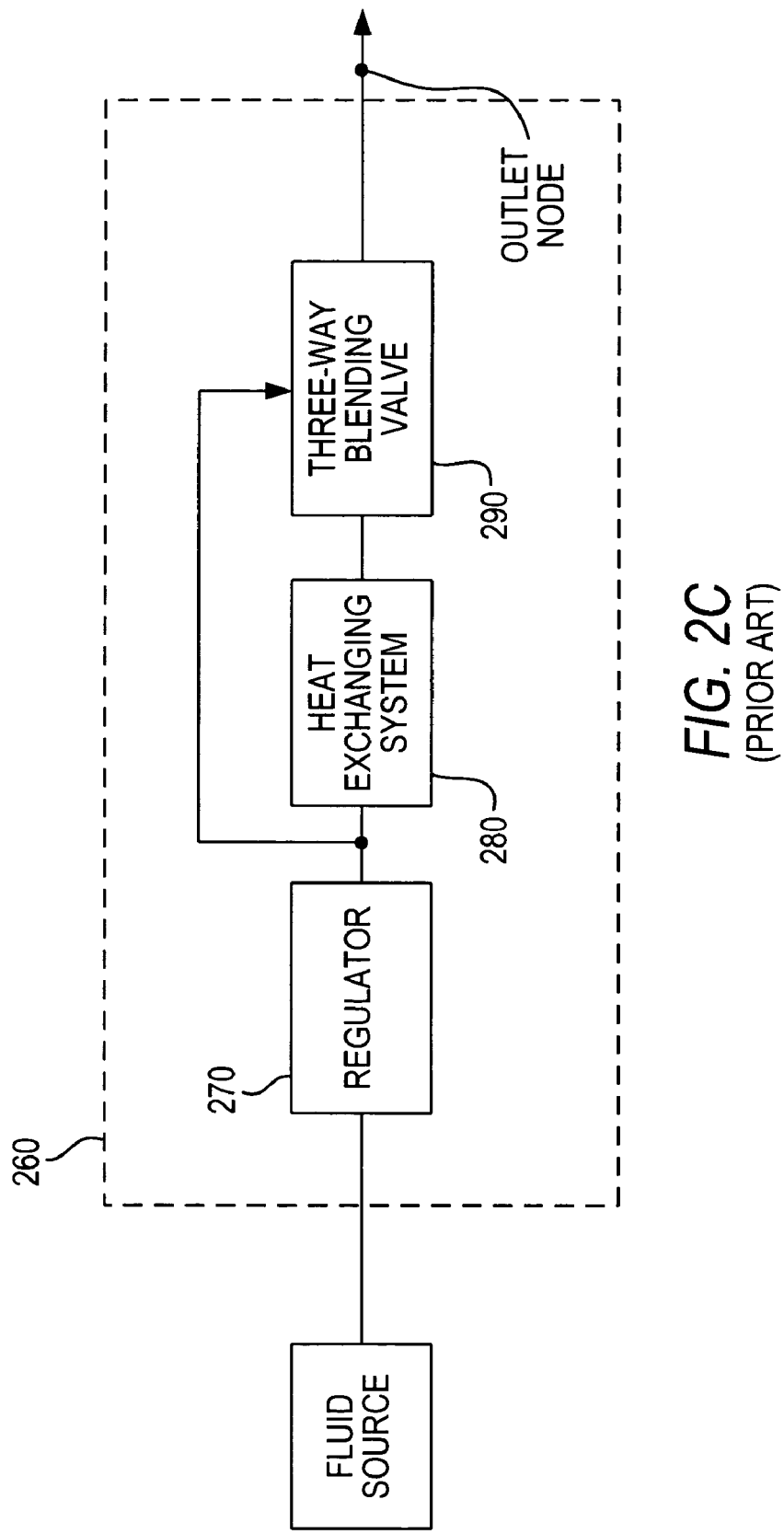

FIGS. 2A-C show prior art dual-path fluid routing systems that attempt to control temperature and pressure of a fluid. In general, the dual-path systems route fluid in two separate paths before combining the fluid into a single path. The temperature of fluid in one of the paths may be driven to a higher or lower temperature than the temperature of fluid in the other path. This disparity in temperature provides a means for producing a desired temperature. For example, assume that the fluid in one path is heated and the fluid in the other path is unheated. These heated and unheated fluids are blended together in the single path to provide a desired temperature. However, the speed and resolution, or degree of control, over temperature and pressure control provided by the systems in FIGS. 2A-C is limited.

FIG. 2A shows a schematic diagram of a prior-art dual-path fluid routing system. Dual-path fluid routing system 100 includes a regulator 120, FCVs 140 and 145, and heat exchanging system 150. During operation, regulator 120 sets the pressure of the fluid provided downstream to outlet node. Regulator 120 may be coupled to receive fluid from one or more fluid sources (although only one such fluid source is shown). FCV 145 regulates the mass flow of fluid through heat exchanging system 150 (e.g., the main path). Heat exchanging system 150 may heat or cool the fluid passing therethrough. For clarity and ease of presentation, assume that heat exchanging system 150, 250 of FIG. 2B, and 280 of FIG. 2C heat the fluid. FCV 140 regulates the mass flow of fluid being routed through the bypass path. Both FCVs 140 and 145 may be set to be fully CLOSED, fully OPEN, or set somewhere between fully OPEN and fully CLOSED.

The mass flow through FCV 140 and FCV 145 controls the temperature of the fluid provided at the outlet node. Particularly, FCV 140 controls the flow of cool fluid to the outlet node and FCV 145 controls the flow of heated fluid to the outlet node. Thus, to achieve a desired temperature of the fluid at the outlet node, the mass flow rates of FCVs 140 and 145 are adjusted accordingly. For example, to cool the temperature of the fluid at the outlet node, the mass flow rate of FCV 140 may be increased relative to the mass flow rate of FCV 145. To heat the temperature of the fluid at the outlet node, the mass flow rate of FCV 145 is increased relative to the mass flow rate of FCV 140.

FIG. 2B shows a schematic diagram of another prior art dual-path fluid routing system. Dual-path fluid routing system 200 includes regulator 220, three-way routing valve 230, and heat exchanging system 250. During operation, regulator 220 regulates the pressure of the fluid supplied by the fluid source. The regulated fluid is provided to three-way routing valve 230 which routes a portion of the fluid to heat exchanging system 250 and the remaining portion of the fluid around heat exchanging system 250. The fluid exiting heat exchanging system 250 is combined with fluid that bypasses heat exchanging system 250 to provide a desired fluid temperature.

Three-way routing valve 230 can control the mass flow of fluid provided to heat exchanging system 250 and the mass flow of fluid that bypasses heat exchanging system 250. Thus, routing valve 230 can cause the temperature of fluid at the outlet node to cool by increasing the mass flow of fluid that bypasses heating system 250 relative to the mass flow of fluid flowing through heating system 250. Moreover, routing valve 230 can cause the temperature of fluid at the outlet node to cool by decreasing the mass flow of fluid that bypasses heat exchanging system 250 relative to the mass flow of fluid flowing through heat exchanging system 250.

FIG. 2C shows a schematic diagram of yet another prior art dual-path fluid routing system. Dual-path fluid routing system 260 includes regulator 270, fluid heating system 280, and three-way valve 290. During operation, three-way valve selectively blends fluid that bypasses heat exchanging system 280 (the cool fluid) with fluid that passes through heating system 280 (the heated fluid) to provide a desired fluid temperature at the outlet node. Regulator 270 regulates the pressure of the fluid, which is provided by a fluid source, to a desired pressure.

If a cooler fluid temperature is desired, three-way valve 290 may increase the mass flow through the bypass path relative to the mass flow through heat exchanging system 280. If a hotter fluid temperature is desired, three-way valve 290 may decrease the mass flow through the bypass path relative to the mass flow of fluid through heat exchanging system 280.

Though fluid systems 100, 200 and 260 may provide control over the temperature and fluid provided to the outlet node, systems 100, 200, and 260 are expensive and relatively bulky because of their use of flow control valves and three-way valves. Moreover, systems 100, 200, and 260 may lack the capacity to exercise precision control over the temperature and pressure of the fluid provided at the outlet node because the valves may not to exercise adequate control over the entire, required operating range. For example, flow control valves and three-way valves may only be able to accurately control mass flow between ten and ninety percent of their operational range. Thus, when certain conditions are imposed on system 100, 200, or 260 that require the FCVs or three-way valves to operate outside the ten to ninety percent range, system 100, 200, or 260 may not be able to accurately control fluid pressure or temperature.

In addition, systems 100, 200, and 260 may be unable to maintain a desired fluid temperature and pressure when operating conditions, such as the fluid supply pressure (supplied by the fluid source) and the heat exchanging capacity of heat exchanging system, vary. For example, if the pressure of fluid supplied by the fluid source changes from 4,500 PSI to about 1,000 PSI systems 100, 200, and 260 may be unable to quickly and accurately compensate for this change and thus fail to provide fluid having a desired temperature and pressure. As another example, systems 100, 200 and 280 may also fail to provide fluid having a desired temperature and pressure if the heating capacity of the heat exchanging system varies.

The present invention overcomes the deficiencies of the prior art by providing a dual-path fluid routing system that uses a flow restriction device to provide enhanced temperature and pressure control. In general, the inclusion of a flow restriction device in a path permits accurate manipulation of mass flow through that path, to a degree of accuracy not attainable by conventional dual-path systems such as those shown in FIGS. 2A-C. Such highly accurate mass flow control may be achieved because the flow restriction device enhances control over the mass flow versus pressure relationship. Embodiments according to the invention take advantage of this relationship by providing fluid routing systems that have a flow restriction device placed downstream from a pressure regulator. Thus, when such a pressure regulator is working against a fixed restriction (provided by the flow restriction device), the mass flow through the path (e.g., the pressure regulator and the flow restriction device) may be accurately controlled as the setpoint pressure of the regulator is varied. For example, when the setpoint pressure of the regulator is increased to a predetermined pressure, the mass flow may increase to a known value, provided that the flow characteristics of the restrictive device are known and that data is available to calculate the mass flow based on the known flow characteristic. When the setpoint pressure of the regulator is decreased to a predetermined pressure, the mass flow may decrease to a known value.

It will be understood that setting the pressure setpoint of a regulator may be one method to control the mass flow through a particular path. Regulators may also be able to control the mass flow through a particular path by adjusting its internal components or mechanism independent of the pressure setpoint. Such internal components or mechanism may automatically adjust the mass flow to maintain a desired outlet pressure using, for example, an internal or a remote sensing scheme. For example, assume that the pressure setpoint of a particular regulator is set to 450 PSI. As such, this regular may provide an outlet pressure of about 450 PSI minus a predetermined pressure drop (caused by the internal mechanism of the regulator. Moreover, at such a pressure setpoint, the mass flow through the regulator reaches a fixed level. When extrinsic factors (e.g., an increase in pressure at the common outlet node or at the outlet of the regulator) affect the pressure output of the regulator, the internal components of the regulator may automatically decrease or increase the mass flow through the regulator to maintain the outlet pressure of about 450 PSI minus the predetermined pressure drop. Thus, pressure regulators can control mass flow in two different ways: one by setting the pressure setpoint and the other which automatically adjust the mass flow to maintain the desired outlet pressure.

The flow restrictions device may enable the dual-path fluid routing systems according to the invention to operate over the entire operating range of the regulators and/or flow control valves being used in the fluid routing system. For example, regulators and flow control valves may exercise accurate control over the entire operational range (e.g., about 0.1% to 99.9%). Such accurate control ensures that the fluid routing systems according to the invention can accurately and quickly respond to changing conditions such as variations in supply pressure and the heating capacity of a heat exchanging system.

Figure 3:
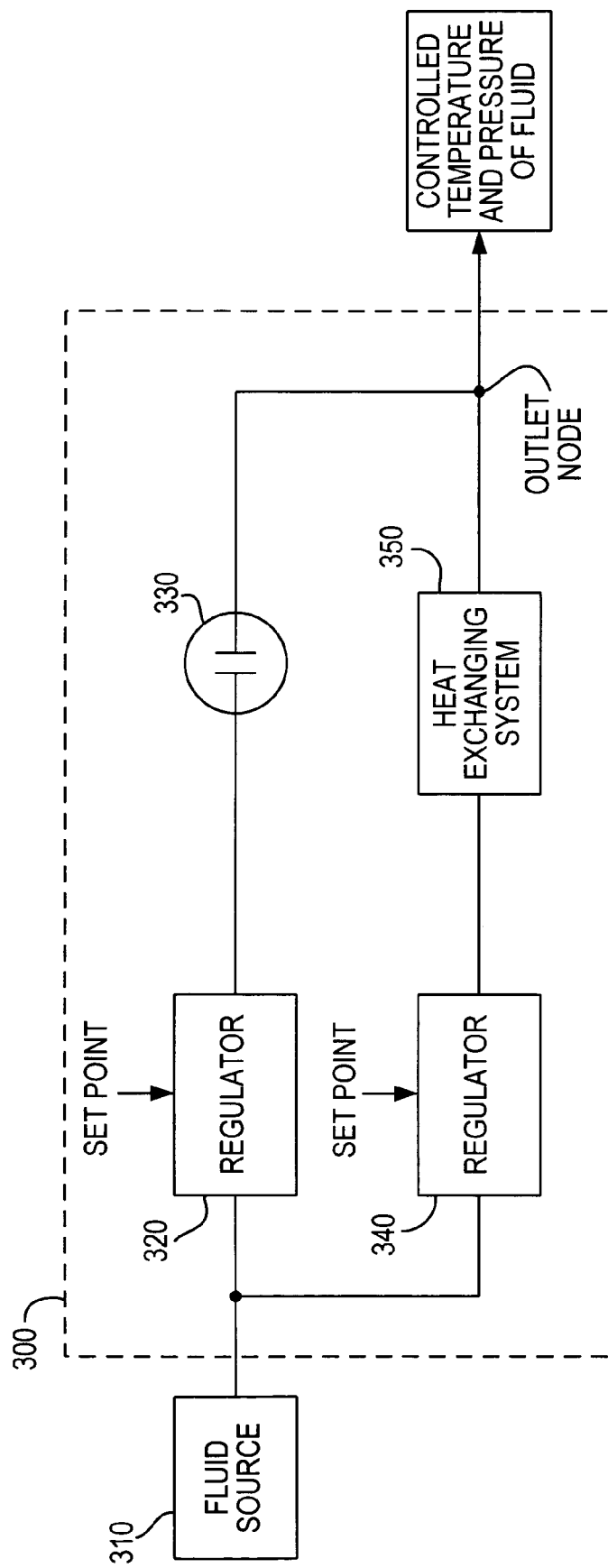
FIG. 3 shows a schematic of a dual-path fluid routing system for controlling temperature and pressure in accordance with the principles of the present invention.

FIG. 3 shows a schematic of a dual-path fluid routing system 300 that is in accordance with the principles of the present invention. Fluid routing system 300 includes regulator 320, flow restriction device 330, regulator 340, and heat exchanging system 350. Although not specifically labeled in FIG. 3, the media for connecting, for example, regulator 320 to fluid source 310 include conventional fluid routing devices such as pipe, hoses, tubing, valves, fittings, and other interconnecting components. It is understood that such media may be used in other embodiments according to the invention.

Regulators 320 and 340 are coupled to receive fluid from fluid source 310. It is understood that regulator 320 and 340 may be coupled to more than one fluid source, but only is shown to avoid cluttering the figure. Regulators 320 and 340 may be pressure regulators capable of being set to regulate the inlet pressure being provided downstream to a predetermined pressure, based on a setpoint pressure, as applied to regulators 320 and 340. In general, the pressure setpoint of a regulator may be set by applying a predetermined pressure to the setpoint port of a regulator. The pressure setpoint of regulator 320 can be set independent of the pressure setpoint of regulator 340. Regulators 320 and 340 may use internal sensing or remote sensing techniques to determine the pressure being supplied downstream by the regulator. Such sensing techniques may be responsible for adjusting the internal components of the regulators to maintain the setpoint pressure at the regulator outlets. A specific example of regulators 320 and 340 that may be used in fluid system 300 may be a 1354 Series, Dome Loaded Regulator, sold by U.S. ParaPlate Corporation, of Corona, Calif.

The pressure setpoint is adjustable and may be set manually or electronically. Manually setting the pressure setpoint of a regulator may be performed by applying a predetermined pressure to the setpoint port of the regulator. Electronic setting of a setpoint pressure can be performed using electronically controlled devices such as transducers, converters, or servo regulators that output a pressure to the setpoint port based on a level of current or voltage being applied to the device. Yet other, more advanced pressure setpoint systems such as those discussed below in connection with the text accompanying FIGS. 10-14 may be used to electronically set the setpoint pressure of regulators 320 and 340.

The inlet of flow restriction device 330 is coupled to receive fluid downstream of regulator 320 and the outlet of flow restriction device 330 is coupled to the outlet node, which is coupled to the outlet of heat exchanging system 350. The outlet node represents a convergence of a main path (which includes regulator 340 and heat exchanging system 350) and a bypass path (which includes regulator 320 and flow restriction device 330). Thus, the fluid at the outlet node may represent a combined fluid having a predetermined pressure and temperature as provided by system 300.

Flow restriction device 330 restricts the flow of fluid from regulator 320 to the outlet node and effectively decouples the operation of regulator 340 from the operation of regulator 320, thereby enabling regulators 320 and 340 to operate independent of each other. More particularly, device 330 enables regulators 320 and 340 to independently control the mass flows through the main and bypass paths even though both paths are connected to each other. That is, regulator 320 independently controls the mass flow through the bypass path and regulator 340 independently controls the mass flow through the main path. Such independent control provides a degree of temperature control not achieved by the prior art fluid routing systems such as those shown in FIGS. 1 and 2.

Flow restriction device 330 may be any device that provides a fixed restriction of fluid flow. For example, flow restriction device 330 may be an orifice that restricts the flow of fluid through a through-hole of a predetermined size (e.g., a size smaller than the diameter of the pipe connecting orifice 330 to regulator 320). As another example, flow restriction device 330 may be a valve that is adjusted to restrict the flow of fluid. As yet a further example, a screen may be used to provide fixed restriction of fluid flow.

Heat exchanging system 350 is coupled to receive fluid downstream from regulator 340 and its output is coupled to output node. Heat exchanging system 350 may be a system capable of heating or cooling the fluid being supplied by regulator 350 to a predetermined temperature. The type of heat exchanging system used in system may depend on whether fluid is to be heated or cooled in the main path. In some embodiments, heat exchanging system 350 may include a heat exchanger or a combination of heat exchangers to heat the fluid. For example, heating system 350 may include a thermal storage unit and/or a fuel powered heat exchanger. As a further example, heat exchanging system 350 may include a stator housing, a power electronics heat sink, and a thermal storage unit. It will be appreciated that heat exchanging system 350 is not limited to the examples described herein and that other heat exchangers and combinations thereof, including the aforementioned heat exchangers, can be used to heat the fluid.

Fluid routing system 300 controls the temperature and pressure of fluid (e.g., gas) being provided by fluid source 310 by independently adjusting the pressure setpoints of regulators 320 and 340, and by relying on the automatic mass flow adjustments performed by the internal components or mechanisms of regulators 320 and 340. By adjusting the pressure setpoints, system 300 can purposely control the mass flow through the main and bypass paths to control the temperature of the fluid at the output node. Moreover, the pressure setpoints of regulators 320 and 340 are adjusted to provide a predetermined pressure to the output node.

When system 300 is operating, pressure from fluid source 310 is stepped down by regulators 320 and 340 before being sent downstream through the main and bypass paths. As the pressure is stepped down to a lower pressure, the expansion of the fluid, results in a drop in temperature. Those of skill in the art will appreciate that expansion of a gas results in a substantially larger temperature change than that achieved by expanding a liquid. As a result, the temperature of the fluid exiting regulators 320 and 340 may be cooler than the temperature of the fluid entering regulators 320 and 340.

The cool fluid is routed through the main path, which heats the fluid (assuming that heat exchanger 350 heats fluid), and the bypass path. The heated fluid and the cool fluid are mixed together to provide a combined fluid of a predetermined pressure and temperature at the outlet node. The main path may be primarily responsible for controlling the pressure and temperature of the fluid at the output node. The bypass path may be secondarily responsible for controlling the pressure and temperature of the fluid at the output node. Though the bypass path may be secondarily responsible it exercises a high degree of control over the mass flow of cool fluid to the outlet node because of flow restriction device.

Temperature and pressure control is obtained through an interplay of changes in pressure setpoints and the consequent changes in mass flow. In accordance with the principles of the present invention, a known increase in setpoint pressure results in a known increase in mass flow, and vice versa. For example, if the temperature of the fluid at the output node is too high, the mass flow of the bypass path may be increased by increasing the setpoint pressure of regulator 320 to lower the temperature by routing more cool fluid to the outlet node. Because an increase of the setpoint pressure of regulator 320 may increase the pressure at the output node, regulator 340 may automatically adjust its internal components to reduce the mass flow therethrough to compensate for such an increase and to maintain a desired pressure at the outlet node. Note that the pressure setpoint applied to regulator 340 may remain fixed, even though the pressure at the common node may be temporarily above a predetermined pressure level.

If the temperature of the fluid at the outlet node is too low, the mass flow of the bypass path can be lowered to increase the temperature. This can be done by decreasing the pressure setpoint of regulator 320. As the pressure in bypass path decreases, the mass flow also decreases, resulting in less cold fluid being provided to the outlet node. This decrease in mass flow is detected by regulator 340 as a decrease in pressure that prompts a subsequent increase in its mass flow (by automatically adjusting its internal components) to compensate for the pressure drop, thereby maintaining the desired pressure to the output node.

During operation of system 300, the setpoint pressure of regulator 320 may be adjusted more frequently than the setpoint pressure of regulator 340. This may be because regulator 340 is primarily responsible for controlling the pressure of the fluid at the common outlet node. Thus, it may be preferable to maintain the pressure setpoint of regulator 340 at a relatively constant level. Moreover, since regulator 320 is connected upstream of flow restriction device 330, it may be more advantageous to vary the setpoint pressure of regulator 320 because of the high degree of mass flow control realized by the regulator/flow restriction device combination.

It is noted, however, that if certain conditions necessitate a change (e.g., increase) in pressure at the common outlet node, the setpoint pressure of regulator 340 may be changed (e.g., increased) accordingly. Such a change in regulator 340 setpoint pressure may be in response to varying conditions such as changes in the fluid supply pressure of varying demands of pressure at the common outlet node.

Flow restriction device 330 advantageously enhances temperature control of the fluid because restriction device 330 provides a fixed restriction that promotes flexibility in controlling mass flow rates in the bypass path. That is, flow restriction device 330 provides the ability to accurately change the mass flow through the bypass path by manipulating the pressure upstream of the restrictive device. In a fluid system void of such a flow restriction device, such as those shown in FIGS. 1 and 2, a relatively small change in pressure can result in a relatively large change in temperature, thereby making temperature control difficult. Whereas in a fluid system having a flow restriction device, a relatively small change in pressure may result in a relatively small or more controlled change in temperature. Moreover, this accurate control may be provided over the entire operating range of the regulators 320 and 340.

It will be appreciated that although the discussion of fluid routing system 300 is described in operative terms to inject more or less cool fluid into the heated fluid to cool that heated fluid to a desired temperature, operation of routing system 300 can be such that more or less heated fluid is injected into a cold stream to warm the cold fluid to a desired temperature. For example, this may be accomplished by having heat exchanging system 350 cool the fluid.

Figure 4:
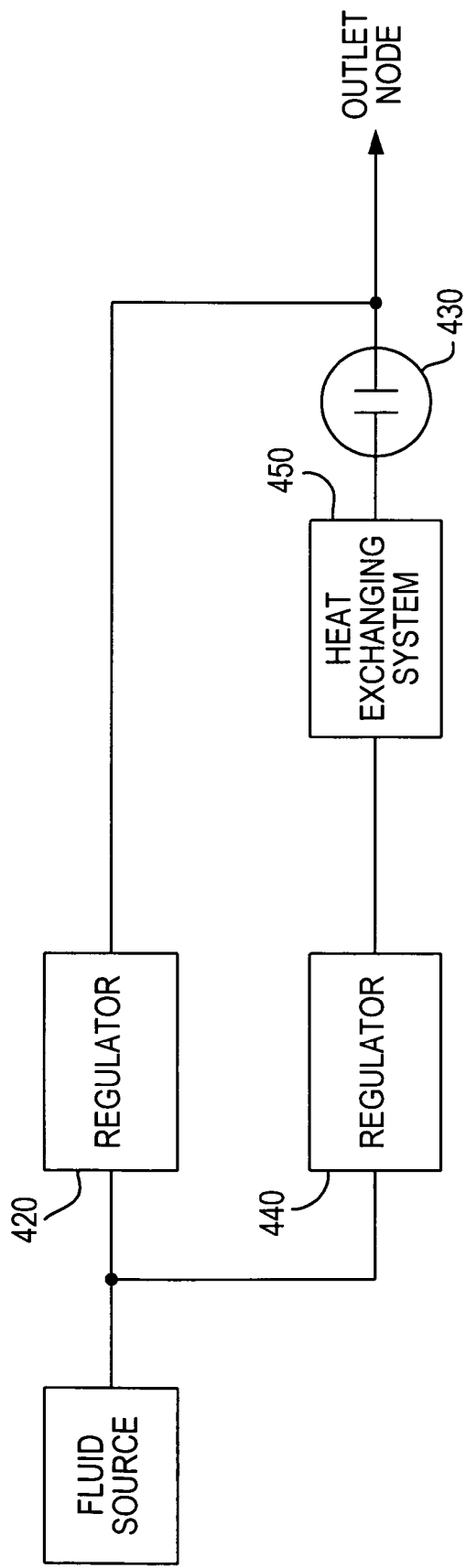
FIG. 4 shows a schematic of a variation of the dual-path fluid routing system of FIG. 3 for controlling temperature and pressure in accordance with the principles of the present invention.
Figure 5:
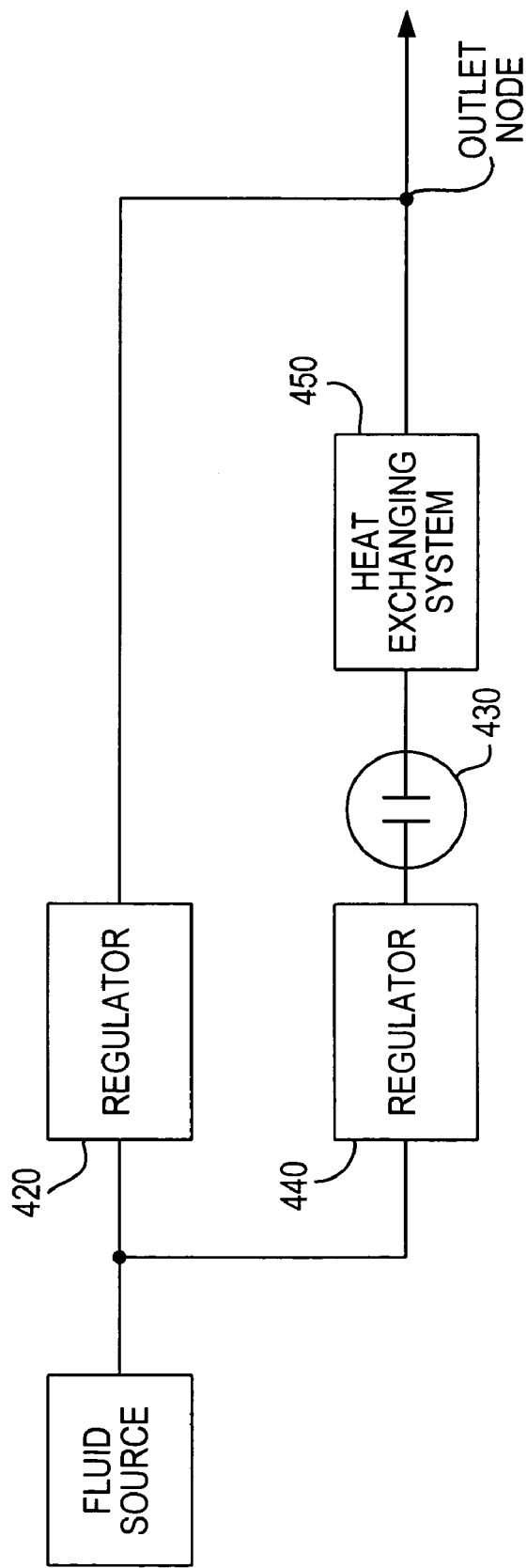
FIG. 5 shows a schematic of another variation of the dual-path fluid routing system of FIG. 3 for controlling temperature and pressure in accordance with the principles of the present invention.

FIG. 4 shows a schematic of a variation of fluid routing system 300 of FIG. 3 that is in accordance with the principles of the present invention. As shown, flow resistance device 430 is placed downstream of heat exchanging system 450, as opposed to being placed downstream of regulator 420. Fluid routing system 400 controls the temperature and pressure of fluid provided to the outlet node using similar principles as described above in connection with FIG. 3. One difference between system 300 and system 400 is that the mass flow through the main path is more restrictive than the mass flow through the bypass path. This may permit the main path to exercise a higher degree control over the mass flow than the bypass path. If desired, flow restriction device 430 may be placed between regulator 440 and heat exchanging system 450, as shown in FIG. 5 to provide a higher resistance main path.

Figure 6:
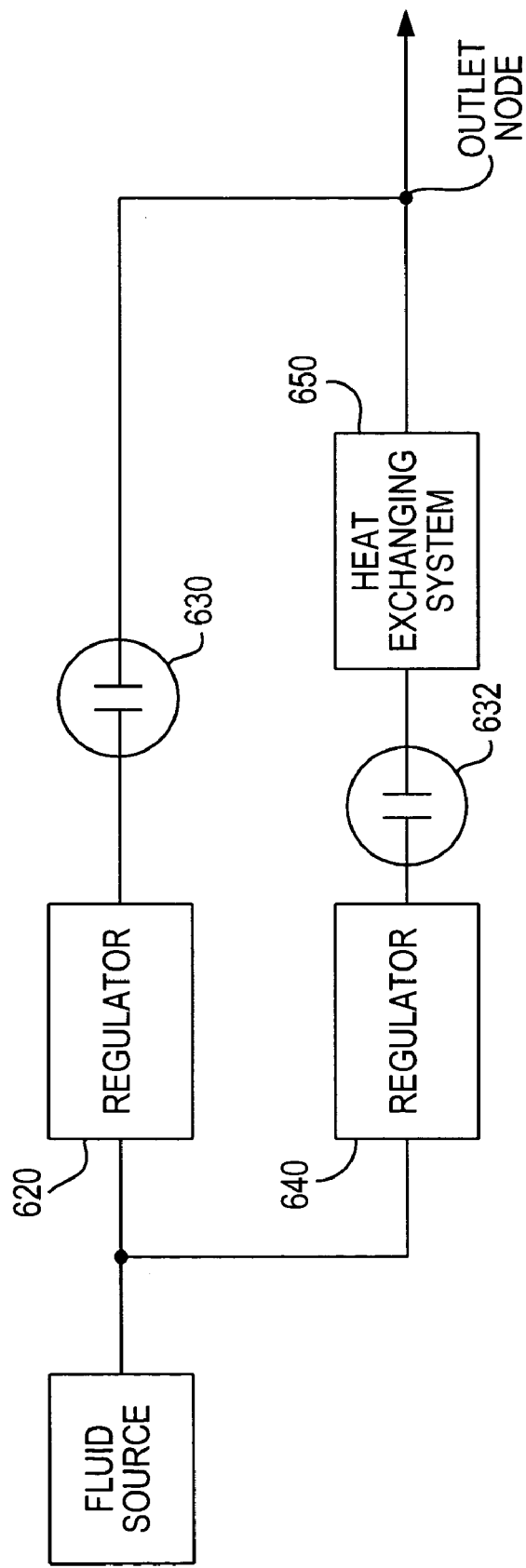
FIG. 6 shows a schematic of yet another variation of the dual-path fluid routing system of FIG. 3 for controlling temperature and pressure in accordance with the principles of the present invention.

FIG. 6 shows a schematic of another dual regulator dual-path fluid routing system 600 that is in accordance with the principles of the present invention. System 600 is similar to system 300 of FIG. 3 except that an additional flow restriction device 632 has been placed downstream of the regulator 640 (shown here between regulator 640 and heat exchanging system 650, but if desired, may be placed after heat exchanging system 650). Inclusion of flow restriction device 632, in addition to flow restriction device 630, may enable system 600 to provide even further enhanced control over the pressure and temperature of fluid provided at the outlet node.

Flow restriction devices 630 and 632 need not have the same flow restriction capacity, nor do they have be the same type of device (e.g., orifice, screen, valve, etc.). For example, the mass flow restriction capacity of device 632 may be less than that of device 630. In alternative embodiment, both devices 630 and 632 may have about the same flow restriction capacity.

Figure 7:
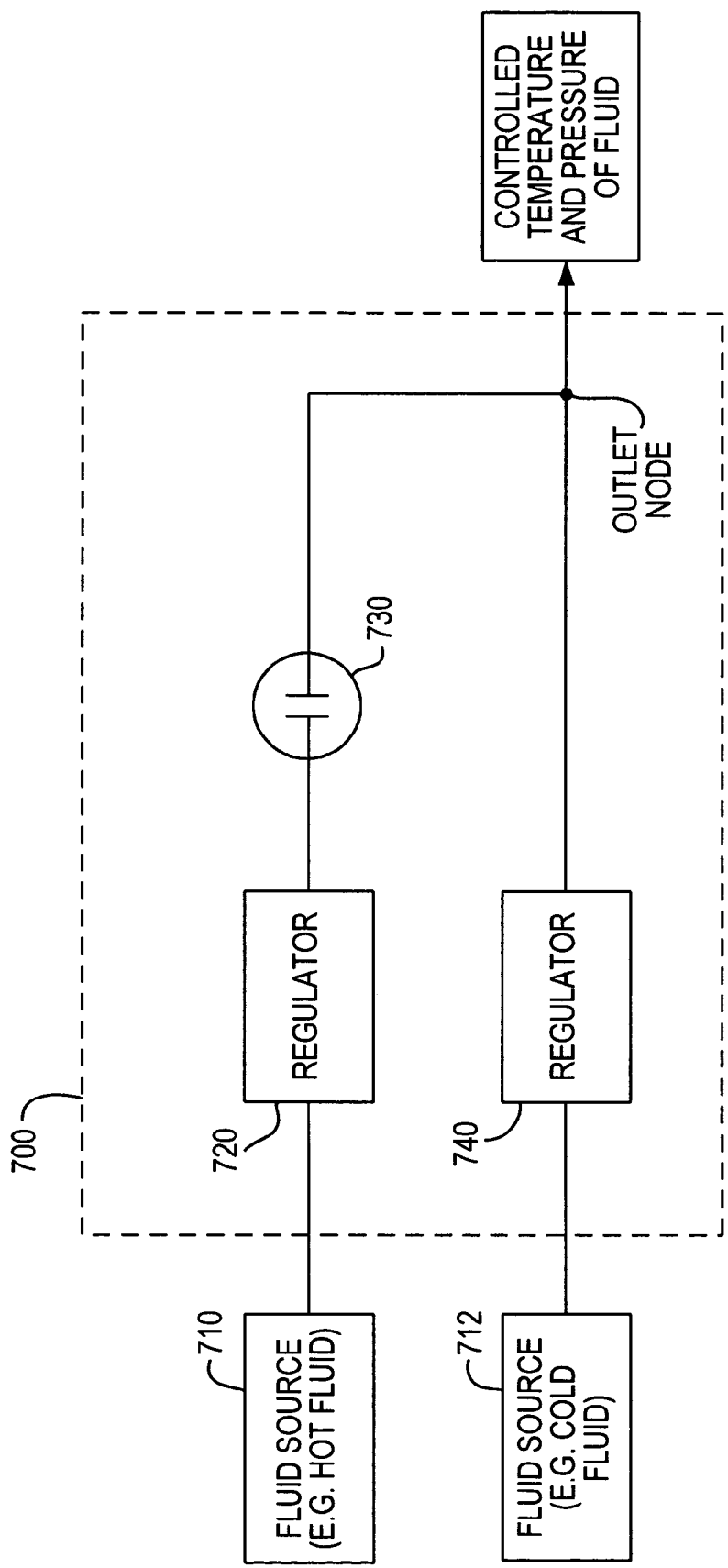
FIG. 7 shows a schematic of an alternative dual-path fluid routing system that uses two fluid sources for controlling temperature and pressure in accordance with the principles of the present invention.

FIG. 7 shows a schematic of yet another dual-path fluid routing system 700 that is in accordance with the principles of the present invention. Fluid routing system 700 includes regulator 720, flow restriction device 730, and regulator 740 and is operative to provide a fluid of a predetermined pressure and temperature at the outlet node. The principles of operation of fluid routing system 700 are similar to that as described above in connection with routing system 300, and thus need not be repeated here.

Notable differences, however, between system 300 and system 700 include use of two independent fluid sources and the omission of a heat exchanging system. As shown, fluid source 710 is coupled upstream of regulator 720 and fluid source 712 is coupled upstream of regulator 740. One fluid source, such as fluid source 710, may contain a hot fluid, whereas the other fluid source, such as fluid source 712, may contain a cold fluid. It is understood that the terms "hot" and "cold" are relative terms. For example, a "cold" fluid may have a ambient temperature, whereas a "hot" fluid may be twice ambient temperature.

During operation, regulators 720 and 740 control the pressure (and mass flow) of the fluid drawn from their respective fluid sources to provide a fluid of a predetermined pressure and temperature at the outlet node. Assume, for example, that the main path includes regulator 740 and the bypass path includes regulator 720 and flow restriction device 730. If fluid source 712 supplies a cold fluid and fluid source 710 supplies a hot fluid, system 700 operates to provide a fluid of a predetermined temperature and pressure by selectively injecting more or less hot fluid via the bypass path into the cold fluid flowing through the main path. Alternatively, if fluid source 712 supplies a hot fluid and fluid source 710 supplies a cold fluid, system 700 operates to provide a fluid of a predetermined temperature and pressure by selectively injecting more or less cold fluid via the bypass path into the hot fluid flowing through the main path.

The dual fluid source arrangement used in connection with system 700 may be particularly advantageous for use with liquid fluids (e.g., water). This may be because the temperature drop of a liquid being stepped down from a high pressure to a low pressure is negligible or non-existent. Thus, if one fluid source is hot and the other cool, system 700 can regulate the combination of the hot and cold liquid fluids to provide a fluid with a predetermined temperature and pressure.

Thus, it is seen that manipulation of an offset of the pressure setpoint of regulator 320 relative to the pressure setpoint of regulator 340 is effective in controlling the temperature and pressure of the fluid at the output node.

An advantage of fluid routing systems, such as those shown in FIGS. 3-7, of the present invention is that they provide accurate control over of a wide range of mass flows. This in turn provides greater control (e.g., temperature resolution) over the temperature being provided at the outlet node. Such temperature control is further enhanced by the inclusion of the flow restricting device, as discussed above. Another advantage of the routing systems according to the invention is that they are compact. There is no need to use large and expensive valves such as those used in the prior art (e.g., flow control valves and three-way valves). Moreover, the routing systems according to the invention are relatively cheap to manufacture and require little or no maintenance.

Yet another advantage of the routing systems according to the invention is that they have fast dynamic response times in adjusting the temperature and pressure of the fluid provided at the outlet node. For example, the routing systems may be controlled by control circuitry (not shown in FIGS. 3-7) to quickly respond to a variety of factors, including but not limited to, varying fluid supply pressure, temperatures changes caused by expansion of fluid, parasitic thermal capacitances, changes in pressure and temperature demands, and changes in heat sources such as a thermal storage unit.

The fast dynamic response times may be realized by the dual path fluid systems according to the inventions at least because of the regulators' ability to automatically adjust mass flow to maintain its setpoint pressure. Thus when a condition changes that the results in a change to the setpoint pressure to, for example, 320, regulator 340 automatically takes that setpoint change into account.

Figure 8:
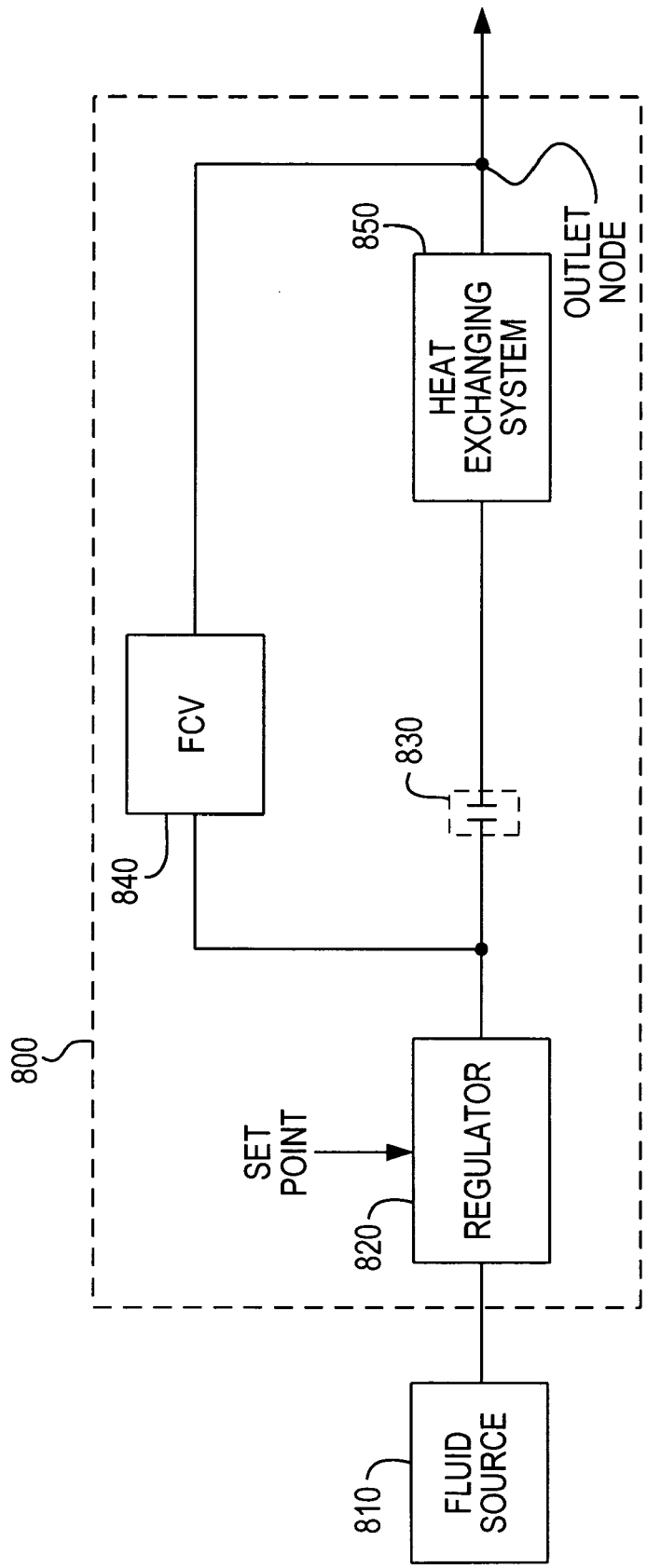
FIG. 8 shows a schematic of a single regulator dual-path fluid routing system for controlling temperature and pressure in accordance with the principles of the present invention.

FIG. 8 shows a schematic of an alternative dual-path fluid routing system that is in accordance with the principles of the present invention. Fluid routing system 800 includes regulator 820, flow restriction device 830, flow control valve (FCV) 840, and heat exchanging system 850. A specific example of FCV 840 that may be suitable for use in systems 800 may be Baumann 24000SB Series Valve, sold by Baumann, Inc., of Portsmouth, N.H. Because the regulators, the flow restriction device, and heat exchanging system have already been discussed above in connection with system 300, the specifics of such components and/or subsystems need not be repeated here.

Regulator 820 is coupled to receive fluid from fluid source 810. The outlet of regulator 820 is connected to the inlets of flow restriction device 830 and FCV 840. The outlet of flow restriction device 830 is connected to heat exchanging system 850. The outputs of FCV 840 and heat exchanging system 850 are connected to the output node. The fluid at output node represents a controlled fluid having a predetermined pressure and temperature.

FCV 840 controls the mass flow of fluid through the bypass path, which is the path connecting the inlet of flow restriction device 830 to the outlet of heat exchanging system 850 via FCV 840. In addition, because of the construction of system 800, FCV 840 also controls the mass flow of fluid through the main path, which is the path connecting the inlet of flow restriction device 830 to the outlet node via flow restriction device 830 and heating system 850. FCV 840 may be an internal sensing or remote sensing flow control valve that determines the mass flow being provided downstream. FCV 840 may be controlled manually or it may be controlled electronically. An electronically controlled FCV 840 may promote fast response times to changing temperature and pressure conditions.

During operation, an interaction between regulator 820 and FCV 840 controls the pressure and temperature of fluid at the outlet node. Regulator 820 primarily controls the pressure by adjusting the pressure setpoint such that a desired pressure is obtained at the outlet node. The pressure downstream of regulator 820 may remain relatively constant during operation. Therefore, the pressure setpoint may not need to be adjusted to compensate for pressure changes caused by different mass flow rates in the bypass and main paths. Rather, the internal components of the regulator may automatically adjust the mass flow to maintain a predetermined outlet pressure. It is understood that the pressure setpoint of regulator 820 may be adjusted to compensate for factors that affect the pressure of fluid provided at the outlet node. Such factors include, for example, loads coupled to the outlet node and changes in pressure of the fluid provided by fluid source 810.

FCV 840, operating in conjunction with flow restriction device 830, primarily controls the mass flow of fluid through the bypass path and the main path. The proportion of mass flow through the bypass path and the main path is a function of the mass flow rate set by FCV 840 and the size of flow restriction device 830. An advantage of flow restriction device 830 is that it enhances FCV 840's ability to control of the proportion of mass flow through the bypass and main paths. Flow restriction device 830 may be sized such that a majority of the mass flow passes through the bypass line when FCV 840 is fully OPEN. The presence of flow restriction device 830 creates a high resistance pathway that impedes fluid flow from regulator 820 to heating system 850. Thus, if FCV 840 is fully OPEN, the fluid may take the path of least resistance and flow through the bypass path. When FCV 840 is fully CLOSED, the fluid may pass through the main path. When FCV 840 is set somewhere between fully CLOSED and fully OPEN, fluid flows through both the bypass and main paths. Thus, by controlling the flow of fluid through the bypass and main paths, temperature control is accomplished by blending heated fluid and cool fluid together at the outlet node.

For example, if the temperature of the fluid is too high, FCV 840 may increase its mass flow rate to route more cool fluid through the bypass path to cool the hot fluid flowing from heat exchanging system 850. Alternatively, if the temperature of the fluid at the outlet node is too low, FCV 840 may decrease its mass flow rate such that less cool fluid is routed through the bypass path and more mass flow routed through the main path.

Thus, it is seen that manipulation of pressure regulator 820 and the mass flow rate through FCV 840 is effective in controlling the temperature and pressure of the fluid provided at the outlet node. An advantage of system 800 over the prior art is that is provides accurate control over a wide range of mass flows. Another advantage of the routing system 800 is that it has fast dynamic response times in adjusting the temperature and pressure of the fluid provided at outlet node. For example, routing system 800 may be controlled by control circuitry (not shown in FIG. 8) to respond to a variety of factors, including but not limited to, varying fluid supply pressure, temperatures changes caused by expansion of fluid, parasitic thermal capacitances, changes in pressure and temperature demands, and changes in heat sources such as a thermal storage unit.

Persons skilled in the art will appreciate that obvious variations of the dual-path fluid routing embodiments (as shown in FIGS. 3-8) may be implemented. For example, two or more regulators may be connected in series, depending on valve design, to provide stable regulation from a maximum storage pressure down a predetermined pressure (e.g., turbine inlet pressure). As another example, two or more regulators (or flow control valves) may be connected in parallel, for example, in the bypass path to increase pressure and mass flow control.

The dual-path fluid system according to the principles of the invention can be implemented in many different types of systems that utilize fluids. For example, the dual-path fluid system may be used in electrical generation systems, chemical process systems, HVAC systems, and industrial process systems. Electrical generation systems may include compressed air storage energy systems and thermal and compressed air storage energy systems, which may be systems that provide backup power (when, for example, a primary power source fails) or continuous power.

Figure 9:
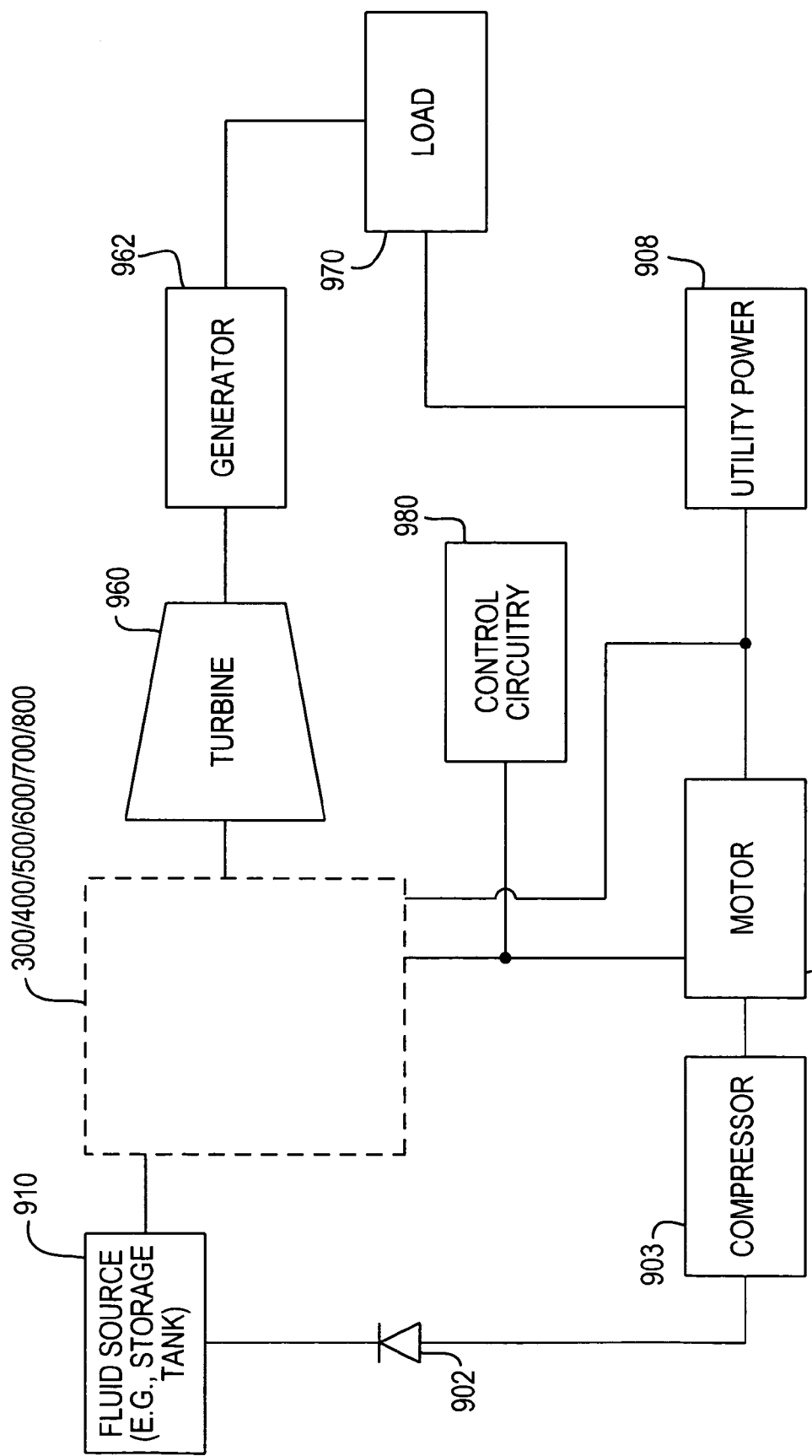
FIG. 9 shows a schematic of a thermal and compressed air storage system that incorporates a dual-path fluid routing system that is in accordance with the principles of the present invention.

FIG. 9 shows a schematic of thermal and compressed air storage backup energy system 900 that utilizes a dual-path fluid routing system in accordance with the principles of the present invention. Backup energy system 900 generates backup power for load 970 in the event of a disturbance of utility power 908 (e.g., downed power line). When utility power 908 fails, system 900 operates in an emergency mode. In this mode, compressed gas stored in fluid source 910 is routed through dual-path fluid routing system according to the invention (e.g., 300/400/500/600/700/800) to drive turbine 960, which in turn powers generator 962 via a shaft (not shown). Generator 962 provides electrical power to load 970 while being powered by turbine 960. When utility power 908 is available, system 900 operates in a standby mode. During standby, utility power 908 supplies power to load 908 and motor 904. Motor 904 selectively drives compressor 903, which routes compressed gas through one-way valve 902 to fluid source 910.

A more detailed explanation of stored air electrical generation system can be found, for example, in co-pending, commonly assigned U.S. patent application Ser. No. 10/361,728, filed Feb. 5, 2003, and U.S. patent application Ser. No.

10/361,729 (now U.S. Patent Publication No. 2004-0148922 A1), filed Feb. 5, 2003, both of which are hereby incorporated by reference in their entireties.

To promote efficient transfer of shaft power to generator 962 from turbine 960, turbine 960 may require a working fluid (e.g., gas or steam) to be delivered at a predetermined temperature and pressure, or within a predetermined range of desired inlet pressure and temperature. Control circuitry 980 may be provided to control operation of a dual-path fluid routing system according to the invention so that a fluid of a predetermined temperature and pressure is provided to the inlet of turbine 960. More particularly, control circuitry 980 may control the regulators and/or flow control valves of the dual-path fluid routing system. Control circuitry 980 may monitor the temperature and pressure of the gas being supplied to turbine 960 and adjust the regulator(s) and/or flow control valve(s) by providing the appropriate signals to compensate for the stochastic operating conditions (e.g., changing pressure of flow source, temperature variations of the heat exchanging system, changes in load demand, etc.) of backup energy system 900. Control circuitry 980 may adjust the mass flow rate of a flow control valve by providing the appropriate electrical or pneumatic signals to a flow control valve. Control circuitry 980 may adjust the pressure output of a regulator by the appropriate electrical or pneumatic signals to a pressure setpoint system such as the system discussed below in connection with the text corresponding to FIGS. 10-14.

The pressure setpoint control system according to the present invention is particularly advantageous for use in connection with regulators in dual-path fluid routing system according to the invention, or for use in connection with other regulators, because it can accurately provide a wide range of setpoint pressures (e.g., 0-1000 PSI), utilize bubble tight shutoff to minimize leakage, and provide failsafe operation in the event of a power loss or other abnormal operating condition. In general, the pressure setpoint control system may control the setpoint pressure of a regulator by selectively applying fluid to and venting fluid from the setpoint port of the regulator. Fluid may be applied and vented from the setpoint port using two valves (e.g., solenoid valves), which are turned ON and OFF according to a duty cycle provided by control circuitry. The valves may be connected in series, with a first valve having its input connected to receive fluid and its output connected to the setpoint port (of a regulator) and the input of the second valve. The outlet of the second valve is connected to atmosphere. When the first valve is ON and the second valve is OFF, fluid is applied to the setpoint port, resulting in an increase of the setpoint pressure. When the first valve is OFF and the second valve is ON, fluid is vented from the setpoint port, resulting in a decrease of the setpoint pressure.

The pressure setpoint control system may employ the use of another valve to ensure failsafe operation. This failsafe valve may have its inlet connected to the setpoint port of the regulator and have its outlet connected to atmosphere. This failsafe valve may be CLOSED when the control system is operating in a normal mode of operation so that the first and second valves can control the setpoint pressure. However, in the event of a failsafe condition (e.g., power failure of other abnormal condition), the failsafe valve automatically OPENS, thereby venting the fluid in the setpoint port to atmosphere.

Figure 10:
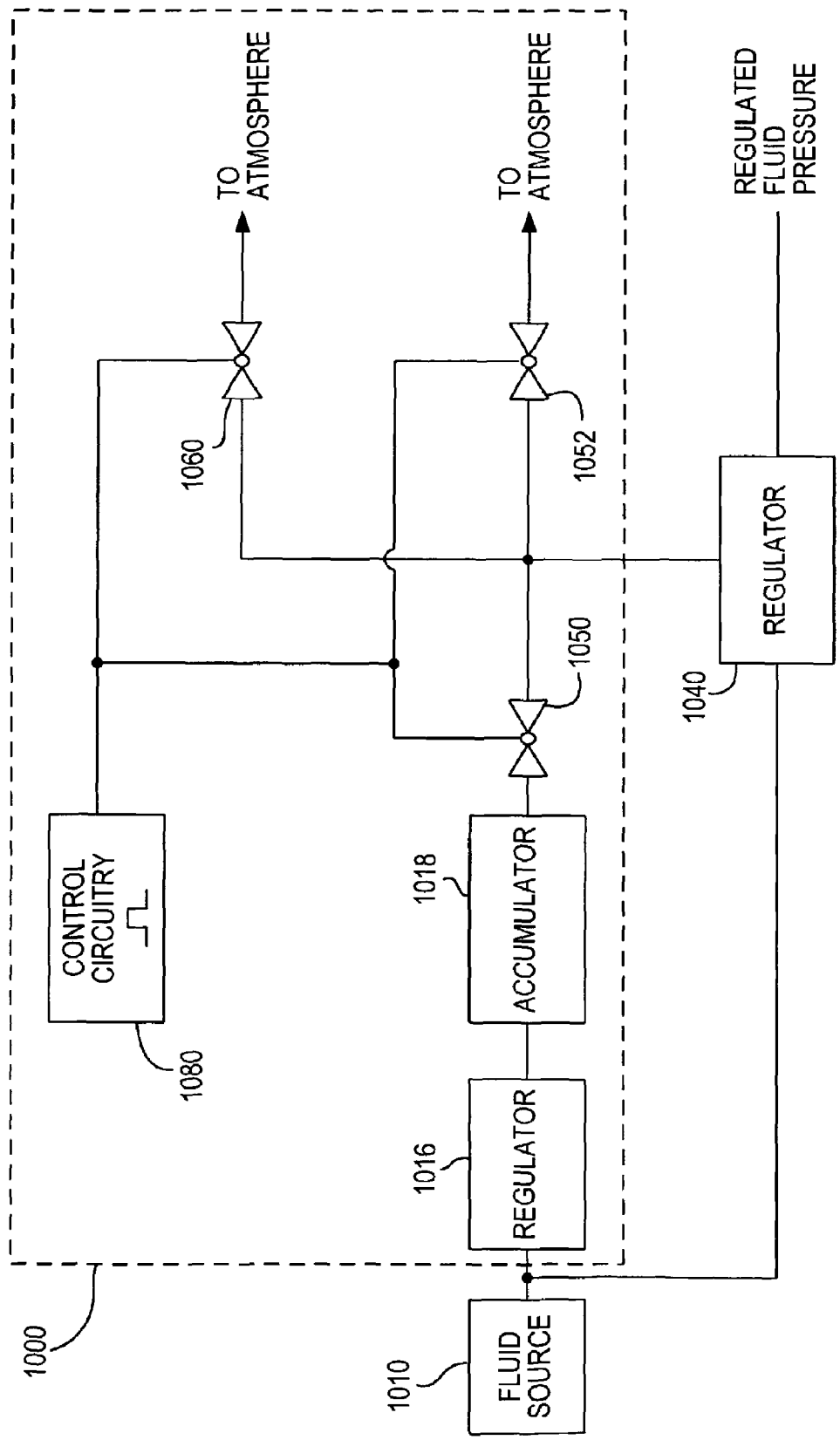
FIG. 10 shows a schematic of a pressure regulator control system that is in accordance with the principles of the present invention.

FIG. 10 shows a schematic diagram of a pressure setpoint control system 1000 that is in accordance with the principles of the present invention. Control system 1000 is operative to adjust the pressure setpoint of a regulator. For example, control system may control the pressure setpoint of one of regulators 320/340/420/440/620/640/720/740/820. Control system 1000 may also be used to adjust the setpoint pressure of pressure regulators used in conventional systems such as those shown in FIGS. 1 and 2. The regulator having its setpoint pressure being controlled by system 1000 may be a dome-loaded regulator. As is known in the art, dome-loaded regulators may output a pressure that is equal to or about equal to the pressure applied to its setpoint pressure port. Differences between the regulator outlet pressure and its setpoint pressure may be caused by variations in the internal configuration of the regulator. For example, preloads and pressure/area imbalances internal to the regulator may cause the regulator output pressure to be 350 PSI for a setpoint pressure of 400 PSI.

Control system 1000 is shown to include regulator 1016, accumulator 1018, valves 1050, 1052, and 1060, and control circuitry 1080. It is understood that the composition of control system 1000 is merely illustrative and that additional components may be added, or certain components may be omitted. For example, control system 1000 may include fluid source 1010 and regulator 1040. As another example, accumulator 1018 may be omitted.

Regulator 1016 may be a manually adjustable regulator that steps down the pressure supplied by fluid source 1010 to a predetermine pressure. Fluid source 1010 is connected to regulator 1040. Accumulator 1018 (e.g., plenum) is connected to regulator 1016 and may be operative to stabilize the pressure and mass flow of fluid provided downstream of regulator 1016. For example, as control system 1000 regulates the pressure setpoint of regulator 1040, accumulator 1018 may prevent undesirable pressure drops during such regulation. The input of valve 1050 is connected to accumulator 1018. The output of valve 1050 is connected to the inputs of valves 1052 and 1060 and to regulator 1040. The output of valves 1052 and 1060 are open to atmosphere. Valves 1050, 1052, and 1060 may be connected to control circuitry 1080.

Valves 1050, 1052, and 1060 may be solenoid valves that are electronically turned ON and OFF by control circuitry 1080. Specific examples of such valves that may be used in a pressure setpoint control system according to the invention may be Model 7122 solenoid valve, sold by Parker Hannifen Corporation, or Model 52 and EH22 solenoid valves, sold by Peter Paul Electronics Company, Inc., both of New Britain, Conn. In addition, valves 1050, 1052, and 1060 may be bubble tight valves, such that when the valves are in the CLOSED position, fluid leakage is negligible. Valves 1050 and 1052 may be normally closed solenoid valves (i.e., valves that are CLOSED when no power is supplied). Valves 1050 and 1052 may be sized to provide accurate control over the pressure setpoint (as discussed in more detail below). Valve 1060 may be a normally opened solenoid valve (i.e., valve is OPEN when no power is supplied). Valve 1060 may be sized to promote rapid discharge of pressure being applied to regulator 1040 in the event of a power failure or other abnormal operating condition.

The operation of control system 1000 is now described. A standby mode of operation is described first, followed by an active mode of operation. If control system 1000 is implemented in a TACAS system such as that described in FIG. 9, the standby mode may be operative when utility power is available and the active mode may be operative when utility power is unavailable. Regardless of which mode of operation the control system 1000 is in, regulator 1016 may be set to a predetermined pressure level.

In standby mode, valves 1050 and 1052 are CLOSED and valve 1060 is OPEN. In this configuration, the pressure setpoint of regulator 1040 is set to atmosphere. Moreover, with valve 1050 CLOSED, it is unlikely that any pressure will be applied to the dome of regulator 1040, thereby preventing fluid from fluid source 1010 from being routed downstream. By closing valve 1050, fluid from fluid source 1010 preferably does not leak, thereby preventing any undesired discharge of fluid in fluid source 1010. However, in the event that valve 1050 malfunctions or fluid leaks therethrough, any pressure that may be applied to the dome of regulator 1040 vents to atmosphere because valve 1060 is OPEN.

Valve 1060 ensures failsafe operation of control system 1000. In the event of a failsafe condition such as, for example, a power failure during, for example, the active mode of operation, valve 1060 automatically OPENS, thereby setting the pressure setpoint to atmosphere.

During an active mode of operation, valve 1060 is CLOSED and valves 1050 and 1052 are selectively turned ON and OFF to regulate the setpoint pressure applied to regulator 1040. When valve 1050 is turned ON, pressure is applied to the dome of regulator 1040. When valve 1052 is turned ON, pressure is relieved from the dome as it vents to atmosphere. A duty cycle, which may be provided by control circuitry (not shown) may be used to control the ON and OFF states of valves 1050 and 1052.

The duty cycle applied to valves 1050 and 1052 may depend on a number of factors including, but not limited to, the desired setpoint pressure, pressure as set by regulator 1016, orifice sizes of valves 1050 and 1052, the setpoint pressure of regulator 1040, and changes in pressure demand downstream of regulator 1040. For example, if control system 1000 is operating in connection with a dual-path fluid routing system, the duty cycle applied to valves 1050 and 1052 may depend on the setpoint pressure that needs to be applied to a particular regulator. It will be appreciated by those with skill in the art that valves 1050 and 1052 need not be turned ON and OFF exclusive of each other and that both valves may be ON for a predetermined period of time or that both may be OFF for a predetermined period of time.

It will be understood that in a fluid routing system such as fluid routing system 300 (FIG. 3), one control system 1000 may be connected to regulator 320 and another control system 1000 may be connected to regulator 340. It will be further understood that certain components (e.g., pressure regulator 1016, accumulator 1018, and control circuitry 1080) may be shared between both control systems that are connected to regulators 320 and 340. For example, fluid routing systems such as fluid routing system 800 (FIG. 8), only one control system 1000 may be needed to control operation of regulator 820.

Figure 11:
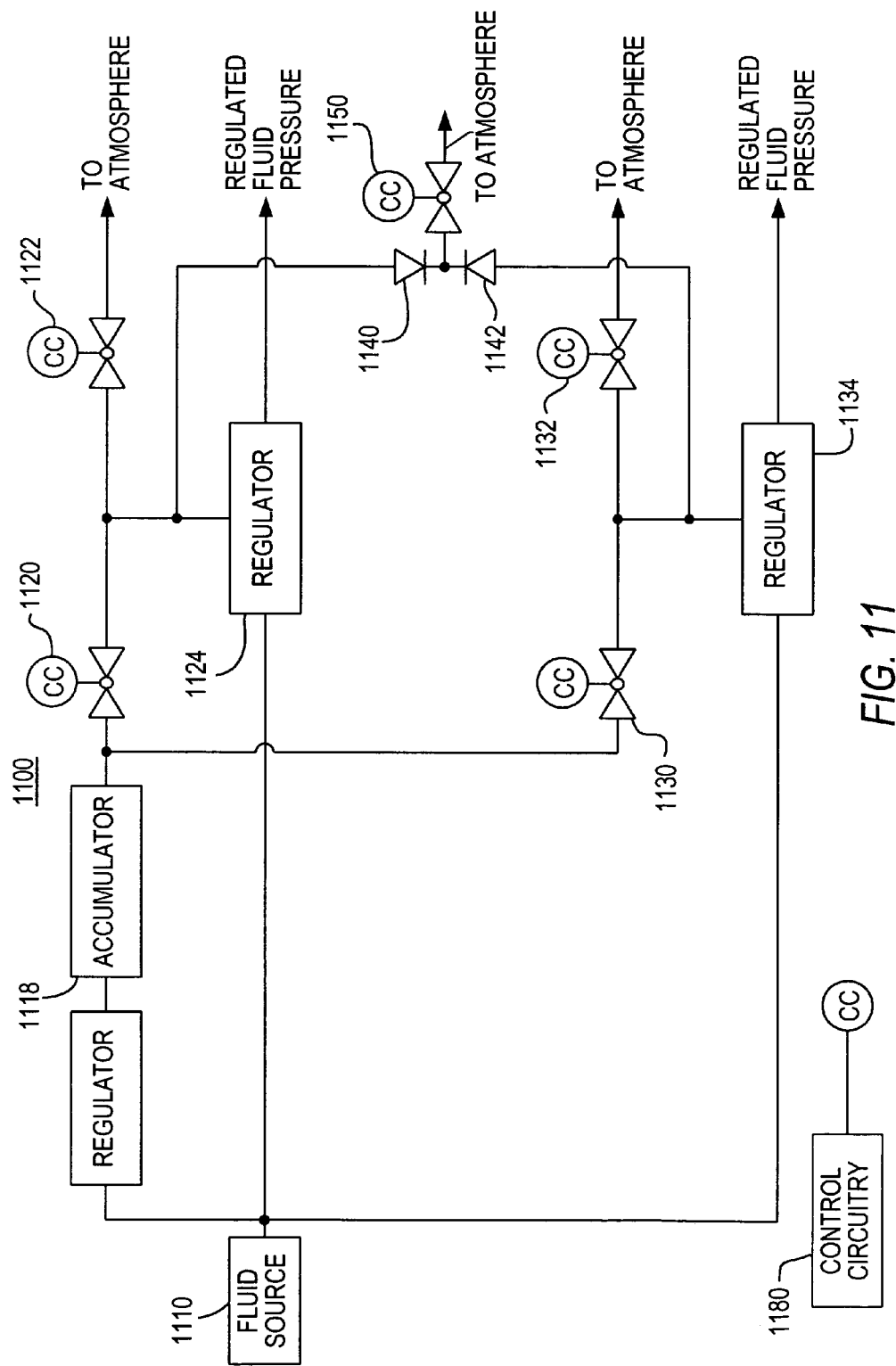
FIG. 11 shows a schematic of an alternative pressure regulator control system that is in accordance with the principles of the present invention.

FIG. 11 shows a schematic diagram of a dual regular pressure setpoint control system 1100 that is in accordance with the principles of the present invention. Control system 1100 is operative to adjust the pressure setpoints of two regulators. For example, if control system 1100 is used in combination with fluid routing system 300 of FIG. 3, system 1100 may control regulators 320 and 340 to provide fluid at a predetermined pressure and temperature.

Control system 1100 is shown to include fluid source 1110, regulator 1116, accumulator 1118, valves 1120, 1122, 1130, 1132, and 1150, regulators 1124 and 1134, one-way valves 1140 and 1142, and control circuitry 1180. It is understood that the composition of control system 1100 is merely illustrative and that additional components may be added, or certain components may be omitted.

Regulator 1116 and accumulator 1118 are the same as regulator 1016 and accumulator 1018. Therefore, a discussion of these two components need not be discussed again in detail. Valves 1120, 1122, 1130, 1132, and 1150 may be solenoid valves that are electrically turned ON and OFF by control circuitry 1180. In addition, valves 1120, 1122, 1130, 1132, and 1150 may be bubble tight valves, such that when the valves are in the CLOSED position, fluid leakage is negligible. Valves 1120, 1122, 1130, and 1132 may be normally CLOSED solenoid valves and valve 1150 may be a normally OPEN solenoid valve. Valves 1120, 1122, 1130, and 1132 may be sized to promote enhanced control over the pressure setpoints of regulators 1124 and 1134. Valve 1150 may be sized to promote rapid discharge of pressure being applied to regulators 1124 and 1134 in the event of a power failure or other abnormal operation. Regulators 1124 and 1134 may be regulators such as dome loaded regulators, as discussed above. One-way valves 1140 and 1142 isolate regulators 1124 and 1134 from each other.

Control system 1100 can operate in a standby and active mode of operation. In a standby mode of operation, valve 1150 is OPEN and any pressure applied to regulators 1124 and 1134 is vented to atmosphere. Valve 1150 also ensures failsafe operation of system 1100 in the same manner in which valve 1060 of system 1000 provides failsafe operation.

During an active mode of operation, valves 1120 and 1122 are operative to control the pressure setpoint of regulator 1124 and valves 1130 and 1132 are operative to control the pressure setpoint of regulator 1134. To adjust the pressure setpoints of regulators 1124 and 1134, control circuitry 1180 may provide a duty cycle that selectively turns valves 1120, 1122, 1130, and 1132 ON and OFF. The discussion of duty cycles previously described in connection with FIG. 10 can be applied to the duty cycle being used in FIG. 11. Therefore, the operation of duty cycles and selectively actuated valves need not be repeated.

Figure 12:
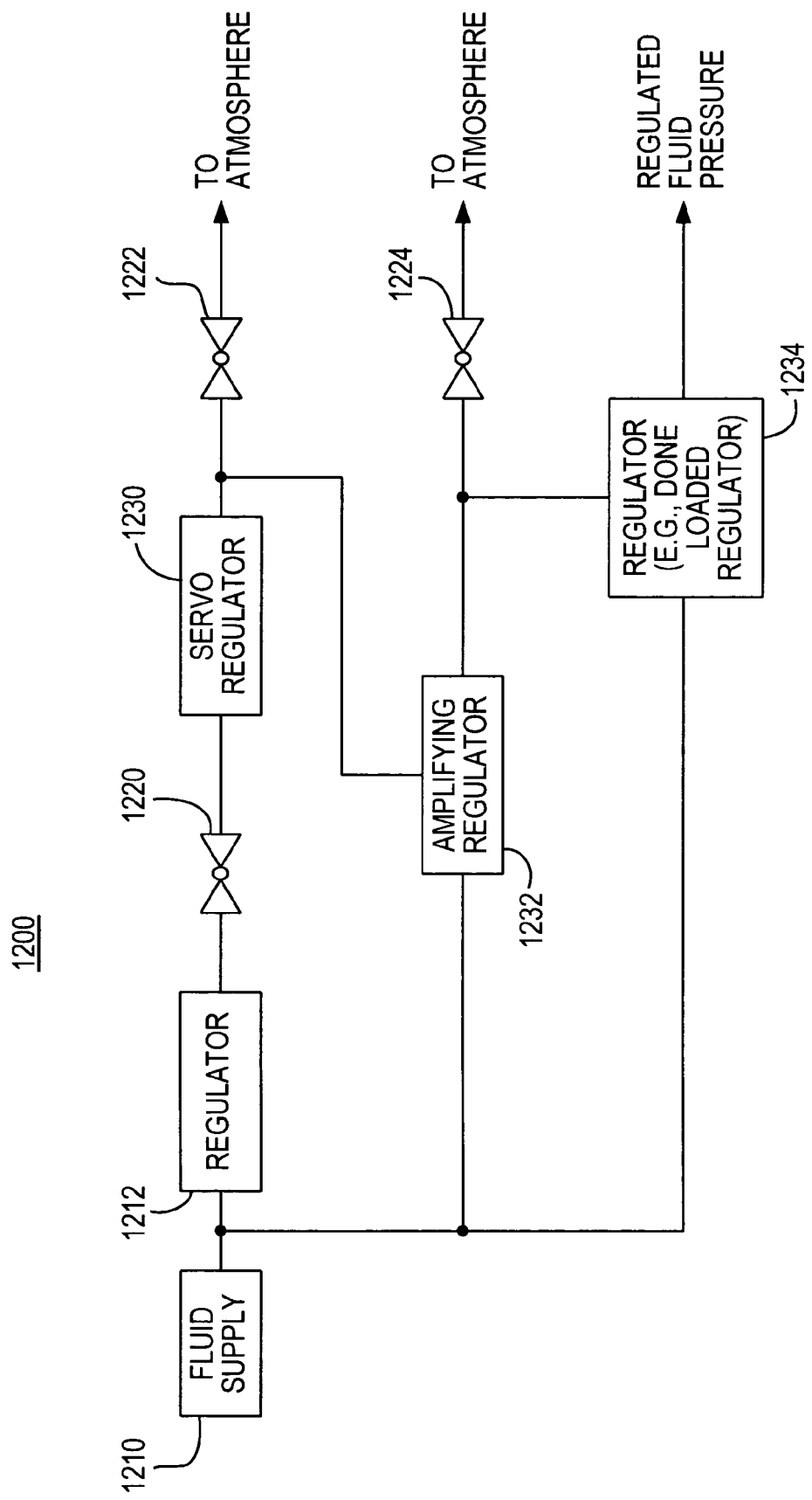
FIG. 12 shows a schematic of another pressure regulator control system that is in accordance with the principles of the present invention.

FIG. 12 shows a schematic diagram of an alternative pressure setpoint control system 1200 that is operative to adjust a pressure setpoint of a regulator in accordance with the principles of the present invention. Control system 1200 is shown to include fluid source 1210, regulator 1212, valves 1220, 1222, and 1224, servo regulator 1230, amplifying regulator 1232, and regulator 1234. It is understood that the composition of control system 1200 is merely illustrative and that additional components may be added, or certain components may be omitted. For example, an accumulator may be added. As another example, valve 1220 may be omitted.

Regulator 1212 may be a manually adjustable regulator that turns down the pressure supplied by fluid source 1210 to a predetermined pressure (e.g., a pressure suitable for servo regulator 1230). Fluid source 1210 is also connected to amplifying regulator 1232 and regulator 1234. Regulator 1212 is connected to the input of valve 1220. Valve 1220 is connected to servo regulator 1230, which is connected to valve 1222 and amplifying regulator 1232. The output of valves 1222 and 1224 is uncoupled and is in contact with the ambient environment. Amplifying regulator 1232 is connected to valve 1224 and regulator 1234.

Valves 1220, 1222, and 1224 may be manually or electronically controlled valves. If electronically controlled, such valves may be solenoid valves that may be turned ON and OFF by control circuitry (not shown). Moreover, if such valves are solenoid valves, valve 1220 may be a normally CLOSED valve and valves 1222 and 1224 may be normally OPEN valves. Valve 1220 may be normally CLOSED to prevent leakage if servo regulator 1230 is unable to fully turn OFF or if servo regulator 1230 is a constant bleed type of regulator. Valves 1222 and 1224 may be normally OPEN to provide failsafe operation. For example, in the event of a power failure or other abnormal operation, valves 1222 and 1224 may automatically OPEN and rapidly vent any pressure being applied to amplifying regulator 1232 and regulator 1234.

Control system 1200 can operate in a standby and an active mode of operation. During an active mode of operation, the pressure output of servo regulator 1230 sets the pressure setpoint of amplifying regulator 1232. The pressure output of servo regulator 1230 may be controlled by a current or pressure signal provided by control circuitry (not shown). Amplifying regulator 1232 amplifies the servo regulator output pressure by a predetermined ratio. This predetermined ratio may be preset or adjustable, depending on the type of amplifying regulator used. This amplified pressure may be used to set the pressure setpoint of regulator 1234. Thus, control system 1200 controls the pressure setpoint of regulator 1234 by controlling the current or pressure signal provided to servo regulator 1230.

Also, during an active mode of operation, valve 1220 is OPEN and valves 1222 and 1224 are selectively OPENED and CLOSED. Valves 1222 and 1224 may be selectively OPENED and CLOSED to provide enhanced pressure control (e.g., bi-directional pressure control). During a standby mode of operation, valve 1220 is CLOSED and valves 1222 and 1224 are OPEN, thereby preventing regulator 1234 from providing fluid downstream.

Figure 13:
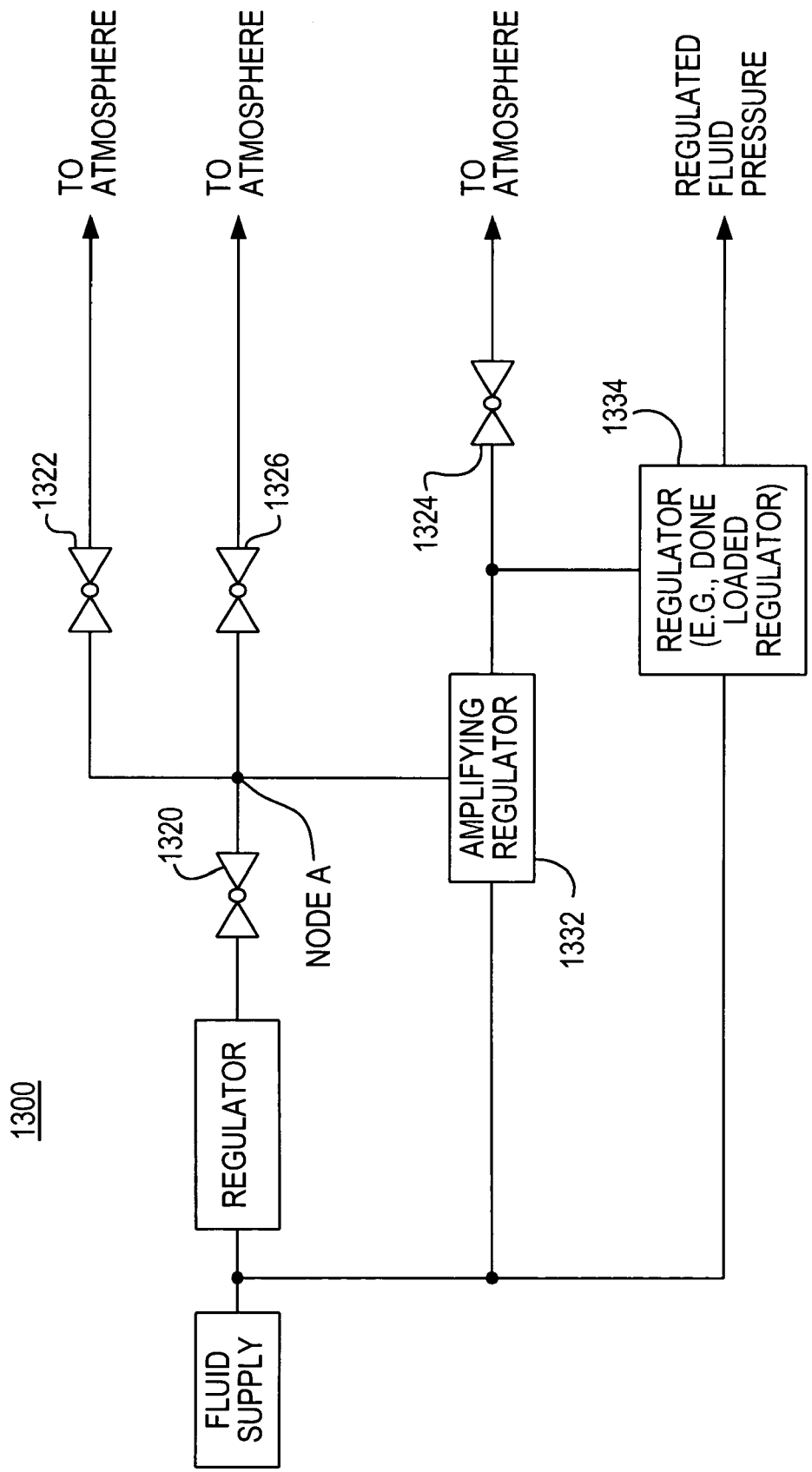
FIG. 13 shows a schematic of an alternative a pressure regulator control system similar to the control system of FIG. 12 that is in accordance with the principles of the present invention.

FIG. 13 shows a schematic diagram of another alternative pressure control system 1300 that is in accordance with the principles of the present invention. In general, control system 1300 is operative to adjust the setpoint pressure of regulator 1334 (e.g., regulator 320, 340, 420, 520, 540, 620, 720, or 820) such that fluid provided from the fluid source is regulated to a setpoint pressure as set by control system 1300. Control system 1300 shares many of the same components of control system 1200, therefore the general operating principles of system 1200 may be applied to system 1300. That is, control system 1300 controls the pressure setpoint of regulator 1334 by controlling the pressure applied to amplifying regulator 1332, which in turns amplifies that pressure by a predetermined ratio to yield an amplified pressure that is used to set the pressure setpoint of regulator 1334.

A structural difference between system 1200 and system 1300 is that the servo regulator is removed and an additional valve 1326 is added. The combination of valves 1320 and 1326, coupled with valve 1322 provides a valve configuration already discussed above in connection with FIGS. 10 and 11. That is, assuming that valves 1320, 1322, and 1326 are electronically controlled by control circuitry (not shown), the control circuitry may apply a duty cycle to valves 1320 and 1326 to control the pressure at Node A.

The pressure at Node A is applied to amplifying regulator 1332, which amplifies the pressure at Node A by a predetermined ratio to provide an amplified pressure. This amplified pressure is applied to regulator 1334 to set the pressure setpoint of regulator 1334. Thus, control system 1300 controls the pressure setpoint of regulator 1334 by controlling the duty cycle applied to valves 1320 and 1326.

It is understood that during an active mode of operation, valves 1322 and 1324 are CLOSED to enable control system 1300 to control the pressure setpoint of regulator 1334. In the event of a power failure or other abnormality, valves 1322 and 1324 automatically OPEN to vent any pressure being applied to amplifying regulator 1332 and regulator 1334. This ensures a fail safe mode of operation.

An advantage of using a duty cycle to control valves (e.g., valves 1050 and 1052 of FIG. 10, valves 1120, 1122, 1130, and 1132 of FIG. 11, and valves 1320 and 1326 of FIG. 13) according to the invention is that it permits an efficient use of control electronics. More particularly, the valves can be driven directly by control circuitry, thereby eliminating the need to use current or pneumatic controlled devices such as a servo regulator to adjust the setpoint pressure. For example, if a servo regulator is used to adjust the pressure setpoint, a digital-to-analog converter, servo electronics, a pressure transducer, and additional valves may be required.

Figure 14:
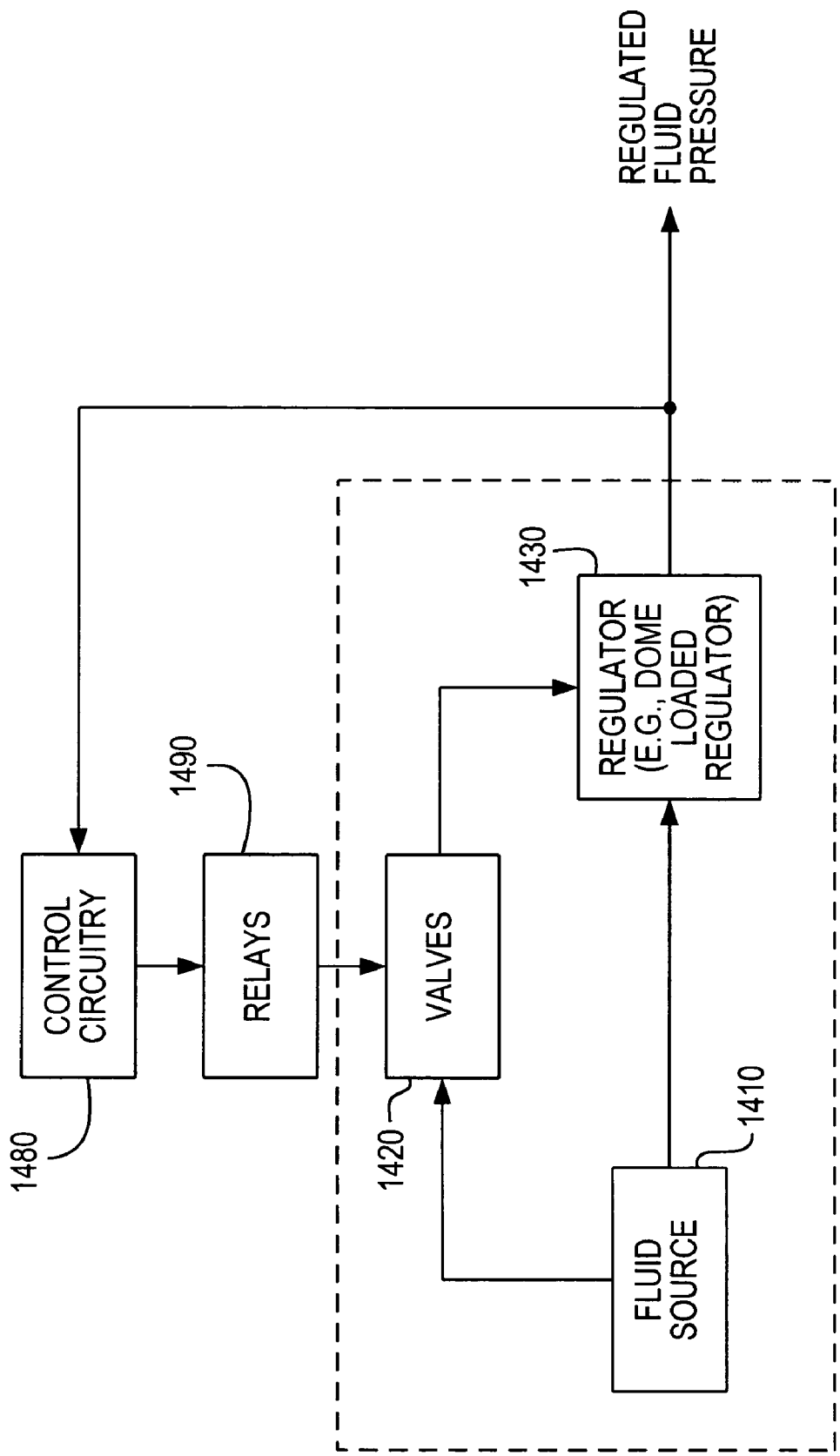
FIG. 14 shows a diagram of a controller arrangement for controlling a pressure regulator control system that is in accordance with the principles of the present invention.

FIG. 14 shows a schematic of a controller arrangement for controlling the setpoint pressure in accordance with the principles of the present invention. The portion of FIG. 14 outlined in the dashed lined box generally represents control systems such as those shown in FIGS. 10, 11, and 13. Therefore, the operation of the fluid source, valves, and regulator need not be repeated. For example, if the dashed box represents control system 1000 of FIG. 10, valves 1420 may include valves 1050, 1052, and 1060. Depending on the control system configuration, regulator 1430 may be a dome-loaded regulator or an amplifying regulator.

Control circuitry 1480 applies signals to relays 1490 (e.g., electronically activated switches), which in turn selectively activate and deactivate valves 1420 based on those signals to control the pressure applied to regulator 1430. Such signals may be derived from a control algorithm that varies the duty cycle as needed to control the setpoint pressure. Control circuitry 1480 may receive a feedback signal from the output of regulator 1430 that may cause control circuitry 1480 to apply different signals to relays 1490 to effect a desired change in output pressure (by adjusting the setpoint pressure of regulator 1430).

An advantage of the control circuit arrangement shown in FIG. 14 is that it is relatively free of unnecessary components, such as digital-to-analog converters, and pneumatic controlled devices that are used in conventional control circuit arrangements for controlling the actuation of valve 1420, the omission of which results in higher reliability and lower costs.

Thus several systems and methods for accurately controlling the temperature and pressure of fluids, and systems and methods for adjusting the setpoint pressure of a regulator are provided. Persons skilled in the art will appreciate that the present invention can be practiced by other than the described embodiments, which are presented for purposes of illustration rather than of limitation, and the present invention is limited only by the claims that follow.

What is claimed is:

1. A system for controlling the setpoint pressure of a regulator, said system comprising:
   a setpoint pressure node;
   a first valve having an inlet connected to receive a fluid and an outlet connected to said setpoint pressure node;
   a second valve having an inlet connected to said setpoint pressure node and an outlet connected to atmosphere;
   a third valve having an inlet connected to said setpoint pressure node and an outlet coupled to atmosphere, said third valve operative to automatically open in the event of a failsafe condition; and
   control circuitry operative to selectively OPEN and CLOSE said first and second valves to control the pressure of fluid applied to said setpoint pressure node.

2. The system defined in claim 1, wherein the pressure provided to said pressure node is the setpoint pressure.

3. The system defined in claim 1, further comprising:
a pressure regulator connected to a fluid source and to the inlet of said first valve, said pressure regulator regulates fluid received from said fluid source.

4. The system defined in claim 1, further comprising:
a pressure regulator connected to received fluid from a fluid source, said pressure regulator regulates said received fluid to a predetermined pressure; and
an accumulator connected to said pressure regulator and to the inlet of said first valve, said accumulator minimizes pressure swings as said first and second valves OPEN and CLOSE.

5. The system defined in claim 1, further comprising:
a fluid source, wherein said first valve is connected downstream of said fluid source; and
a regulator coupled to receive fluid from said fluid source, said regulator having a setpoint pressure port connected to said setpoint pressure node and operative to provide fluid downstream based on the pressure of fluid applied to said setpoint pressure port.

6. The system defined in claim 1, wherein said first, second, and third valves are electronically actuated solenoid valves.

7. The system defined in claim 6, wherein said first and second valves are normally CLOSED solenoid valves.

8. The system defined in claim 6, wherein said third valve is a normally OPEN solenoid valve.

9. The system defined in claim 1, wherein said first, second, and third valves are bubble tight solenoid valves.

10. The system defined in claim 1, wherein said first and second valves are CLOSED and said third valve is OPEN when said system is operating in a standby mode.

11. The system defined in claim 1, wherein said third valve is CLOSED when said system is controlling the pressure being applied to said setpoint pressure node.

12. The system defined in claim 1, further comprising:
an amplifying regulator having an inlet connected to receive fluid, an amplifier setpoint port connected to said setpoint pressure node, and an amplifier outlet, said amplifying regulator amplifies the pressure applied to said amplifier setpoint port to an amplified pressure and provides said amplified pressure to said amplifier outlet, said amplified pressure is the setpoint pressure.

* * * * *